United States Patent
Kim

(10) Patent No.: US 9,368,081 B2
(45) Date of Patent: Jun. 14, 2016

(54) DISPLAY DEVICE AND METHOD OF CONTROLLING THE SAME

(71) Applicant: LG Electronics Inc., Seoul (KR)

(72) Inventor: Hansu Kim, Seoul (KR)

(73) Assignee: LG Electronics Inc., Seoul (KR)

( * ) Notice: Subject to any disclaimer, the term of this patent is extended or adjusted under 35 U.S.C. 154(b) by 192 days.

(21) Appl. No.: 14/179,816

(22) Filed: Feb. 13, 2014

(65) Prior Publication Data

US 2015/0062175 A1  Mar. 5, 2015

(30) Foreign Application Priority Data

Sep. 3, 2013  (KR) .................. 10-2013-0105592

(51) Int. Cl.
| G09G 5/00 | (2006.01) |
| G09G 3/36 | (2006.01) |
| G06F 3/0488 | (2013.01) |
| G06F 1/16 | (2006.01) |

(52) U.S. Cl.
CPC ............ *G09G 3/3648* (2013.01); *G06F 1/1626* (2013.01); *G06F 3/0488* (2013.01); *G06F 3/04886* (2013.01); *G06F 2203/04804* (2013.01); *G09G 2300/023* (2013.01)

(58) Field of Classification Search
None
See application file for complete search history.

(56) References Cited

U.S. PATENT DOCUMENTS

| 2009/0138811 A1* | 5/2009 | Horiuchi | G06F 3/04842 715/768 |
| 2009/0295731 A1* | 12/2009 | Kim | G06F 1/1616 345/168 |
| 2009/0298548 A1* | 12/2009 | Kim | H04M 1/72544 455/566 |
| 2009/0322695 A1* | 12/2009 | Cho | G06F 3/0416 345/173 |
| 2011/0039605 A1* | 2/2011 | Choi | H02J 7/0047 455/573 |
| 2012/0060089 A1* | 3/2012 | Heo | G06F 1/1647 715/702 |
| 2012/0105487 A1* | 5/2012 | Son | G06F 3/0487 345/671 |
| 2013/0265232 A1* | 10/2013 | Yun | G09G 3/3208 345/158 |
| 2013/0265284 A1* | 10/2013 | Yun | G06F 3/0488 345/175 |
| 2013/0314433 A1* | 11/2013 | Ko | G09G 3/20 345/592 |
| 2014/0063046 A1* | 3/2014 | Jung | G06F 1/1652 345/592 |
| 2014/0149927 A1* | 5/2014 | Yoon | G09G 5/10 715/794 |

* cited by examiner

*Primary Examiner* — Xiao Wu
*Assistant Examiner* — Mohammad H Akhavannik
(74) *Attorney, Agent, or Firm* — Lee, Hong, Degerman, Kang & Waimey; Jonathan Kang; Richard Salfelder

(57) ABSTRACT

A display device is provided that includes a transparent display unit, a setting unit that sets transparency of a first screen that is output in the foreground to the transparent display unit, and a controller that determines transparency of a background object that is seen through the transparent display unit, based on the transparency of the first screen that is set, such that the transparency of at least one of the background object and at least one region of the first screen is changed, based on a detected event that is associated with transparency control of the transparent display unit.

19 Claims, 23 Drawing Sheets

(a)

(b)

(c)

(a)

(b)

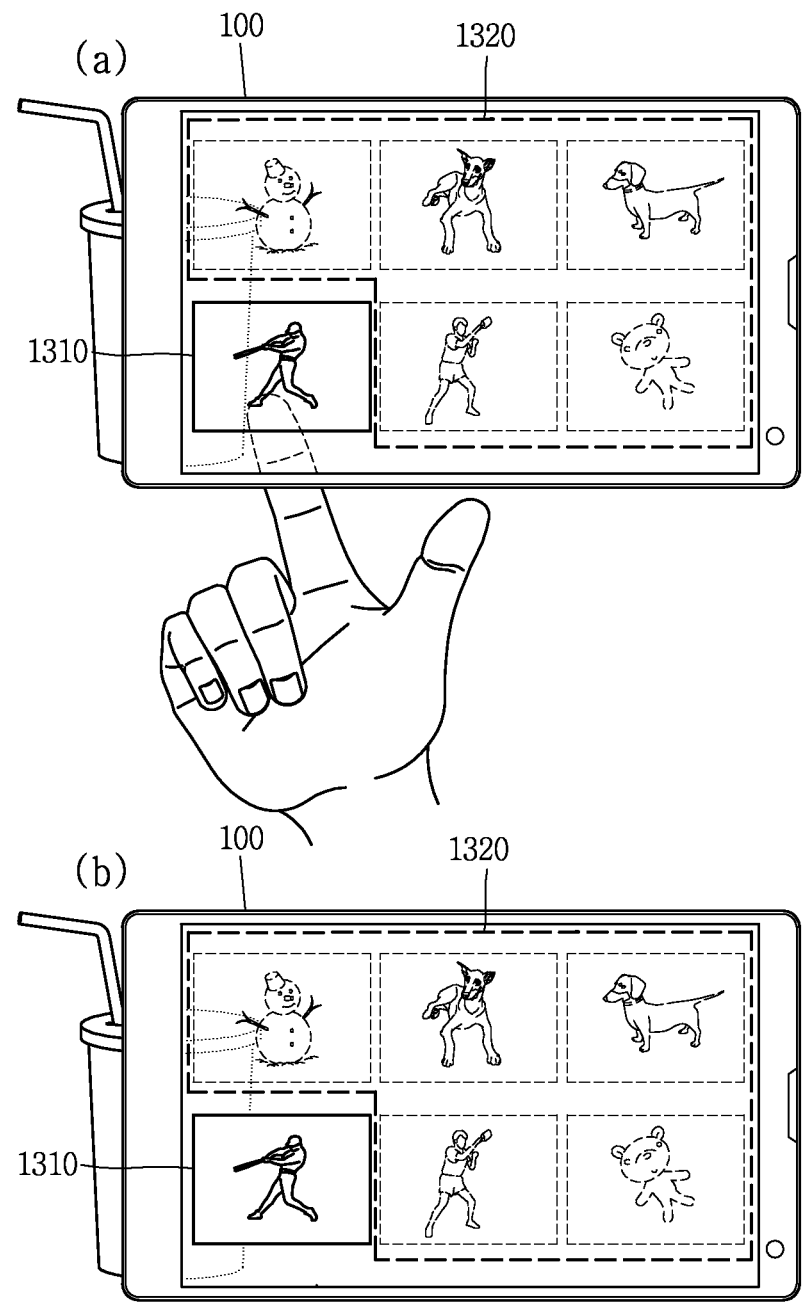

DISPLAY DEVICE AND METHOD OF CONTROLLING THE SAME

CROSS-REFERENCE TO RELATED APPLICATION

Pursuant to 35 U.S.C. §119(a), this application claims the benefit of earlier filing date and right of priority to Korean Application No. 10-2013-0105592, filed on Sep. 3, 2013, the contents of which are incorporated by reference herein in its entirety.

BACKGROUND

1. Field of the Disclosure

The present invention relates to a display device including a transparent display unit.

2. Background of the Related Art

A terminal is broadly categorized by mobility into a mobile/portable terminal and a stationary terminal. The display device is further categorized by portability into a handheld terminal and a vehicle-mounted terminal.

In response to an increasing demand for diversified functions, the terminal has been realized in the form of a multimedia player with multiple functions such as shooting a photographic object as a still image or moving images, reproducing digital audio and video compression files, playing a game, receiving a broadcast or the like. Furthermore, structural and software modifications to the terminal are considered for supporting and improving functions of the display device.

Generally, an LCD (Liquid Crystal Display) is widely as a display unit for a terminal. An OLED (Organic Light Emitting Diodes) has recently been used as the display unit. Particularly, there have recently been developments in an imaging technology and a transparent electronic element development technology. Active research has been made on a type of transparent display panel which enables an object in back of the transparent display panel to be seen and is also used as a display screen.

The terminal is diversified in functionality and evolves into various designs. Accordingly, when the transparent display panel is used as the display unit for the terminal, there is a need for providing the user with a convenient user interface (UI) and visibility.

SUMMARY OF THE DISCLOSURE

Therefore, an aspect of the present invention is to provide a display device that is capable of outputting with improved visibility a screen of an application that is being executed on a transparent display unit and a method of controlling the display device.

Another aspect of the present invention is to provide a display device that is capable of adjusting transparency of at least one region of a screen of an application that is being executed on a transparent display unit and a method of controlling the display device.

To achieve these and other advantages and in accordance with the purpose of the present invention, as embodied and broadly described herein, there is provided a display device including a transparent display unit, a setting unit that sets transparency of a first screen that is output in the foreground to the transparent display unit, and a controller that determines transparency of a background object that is seen through the transparent display unit, based on the transparency of the first screen that is set, and when an event associated with transparency control of the transparent display unit occurs, changes the transparency of one or more background object and at least one region of the first screen, based on the detected event.

The controller may apply transparency to the background object higher than the transparency that is set for the first screen.

If the number of multiple background objects is two or more, the controller may apply different transparent to each of the multiple background objects depending on the extent to which each of the multiple background objects is separated from the transparent display unit.

When an event that a second screen is output in the background to the transparent display unit, the controller may apply transparency higher than the transparency that is set for the first screen, to the second screen, or may decrease the transparency that is set for the first screen, to such an extent that the first screen is distinguishable from the second screen and apply transparency higher than the transparency that is set for each of the first and second screens, to the background object.

If the number of the screens that are output in the background to the transparent display unit is two or more, the controller may apply the transparency, beginning with the highest one, and ending with the lowest one, Beginning with a screen that corresponds to an application that has been executed most previously and ending with a screen that corresponds to an application that has been most recently, respectively, and may apply to the background object the transparency higher than the transparency of the screen corresponding to the application that has been most previously.

When an event that states of the first screen and the second screen are switched, the controller may apply the first screen to the second screen and may increase the transparency of the first screen and output the first screen and the second screen.

When a predetermined touch event occurs on an input region of the first screen, the controller may decrease at least transparency of the input region or may switch the input region to a non-transparency mode until the input region disappears.

When a graphic image that receives a touch corresponding to the input region is output to one region of the transparent display unit, the controller may decrease transparency of a region on which the graphic image is displayed, to less than the transparency of the first screen, or may switch the region on which the graphic image is displayed, to the non-transparency mode.

The setting unit may set clearness priority of the background object and the first screen according to an execution state of an application that is executed on the transparent display unit, and the controller may change the transparency of at least one of the first screen and the background object, based on the clearness priority that is set.

If the execution state of the application is a preview screen of a camera, the setting unit may set clearness of the background to more than clearness of the first screen, and the controller may increase the transparency of the first screen and decrease the transparency of the background object to less than the transparency of the first screen.

The setting unit may set different transparency according to a predetermined type of application that corresponds to the first screen.

When a touch input occurs on a border region of the first screen, the controller may switch at least one region of the first screen to a non-transparency mode along a dragging direction of the touch input and in proportion to the extent of dragging, and may output a visually-distinguishable indication to at least one border line of the region that is switched to the non-transparency mode.

When a drag touch input occurs that is applied in a second direction opposite to the dragging direction with the indicator displayed on the first screen serving as a reference, the controller may switch at least one region of the first screen to a transparency mode along the second direction and in proportion to the extent of the dragging and may apply a predetermined transparency to the region that is switched to the transparency mode.

An indicator for adjusting the transparency of the first screen may be displayed on one region of the transparent display unit, and the controller may differently adjust the transparency of the first screen according to the extent to which a touch applied to one point on the indicator is dragged.

The display device may further include a gaze tracking unit that detects a user's gaze that is present within a predetermined range with the transparent display unit serving as a reference, and the controller changes transparency of at least one region of the first screen based on the user's gaze that is detected.

When the user's gaze that is detected is fixed on a specific region of the first screen for a predetermined time, the controller may gradually decrease transparency of the specific region or may switch the specific region to a non-transparency mode.

The display device may further include a sensing unit that detects a change in strength of light that enters the transparent display unit, according to an inclination of a terminal, and the controller adjusts a difference in transparency between a first region on which a character in the first screen is displayed and a second region that is out of the first region.

When a section signal with respect to a specific object that is displayed on the first screen is received, the controller may switch a region of the first screen, on which the specific object is displayed, to a non-transparency mode, and may output an indication that corresponds to the non-transparency mode to which the region is switched.

When a transparency mode is selected in a state where an application corresponding to the first screen is executed, the controller may prevent the specific object from being further displayed on the first screen and may output an already-registered substitute image to a region on which the specific object is displayed.

To achieve these and other advantages and in accordance with the purpose of this specification, as embodied and broadly described herein, there is provided a method of controlling a display device that includes outputting a first screen in the foreground to a transparent display unit, applying predetermined transparency to the first screen, determining transparency of a background object that is seen through the transparent display unit, based on the transparency of the first screen, and changing the transparency of one or more of the background object and one region of the first screen, based on the event.

Further scope of applicability of the present application will become more apparent from the detailed description given hereinafter. However, it should be understood that the detailed description and specific examples, while indicating preferred embodiments of the invention, are given by way of illustration only, since various changes and modifications within the spirit and scope of the disclosure will become apparent to those skilled in the art from the detailed description.

BRIEF DESCRIPTION OF THE DRAWINGS

The accompanying drawings, which are included to provide a further understanding of the disclosure and are incorporated in and constitute a part of this specification, illustrate exemplary embodiments and together with the description serve to explain the principles of the disclosure.

In the drawings:

FIG. 13 is diagram for describing a control method in which transparency of a specific object that is displayed on a front surface of the transparent display unit is adjusted in response to a touch event that is applied to a back surface of the transparent display unit.

DETAILED DESCRIPTION OF THE DISCLOSURE

Description will now be given in detail according to the exemplary embodiments, with reference to the accompanying drawings. For the sake of brief description with reference to the drawings, the same or equivalent components will be provided with the same reference numbers, and description thereof will not be repeated.

A suffix "module" or "unit" used for constituent elements disclosed in the following description is merely intended for easy description of the specification, and the suffix itself does not give any special meaning or function. In describing the present invention, if a detailed explanation for a related known function or construction is considered to unnecessarily divert the gist of the present disclosure, such explanation has been omitted but would be understood by those skilled in the art. The accompanying drawings are used to help easily understood the technical idea of the present invention and it should be understood that the idea of the present disclosure is not limited by the accompanying drawings.

Display devices described herein may include cellular phones, smart phones, laptop computers, digital broadcasting terminals, personal digital assistants (PDAs), portable multimedia players (PMPs), navigators, slate PCs, tablet PC, ultra books and the like. However, it may be easily understood by those skilled in the art that the configuration according to the exemplary embodiments of this specification can be applied to stationary terminals such as digital TV, desktop computers and the like excluding a case of being applicable only to the display devices.

Figure 1:
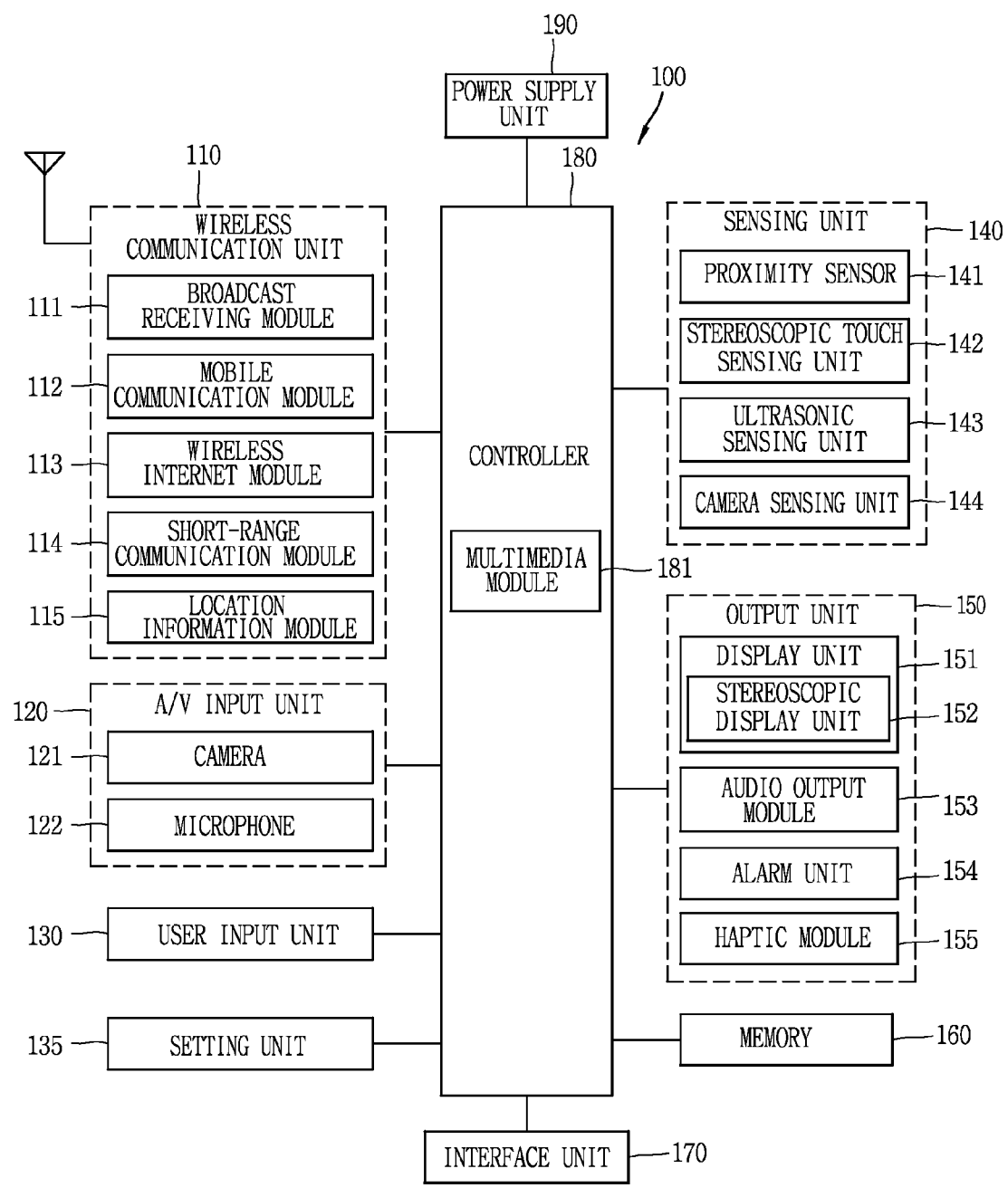
FIG. 1 is a block diagram illustrating a display device according to one embodiment of the present invention.

FIG. 1 is a block diagram of a display device 100 in accordance with one exemplary embodiment.

The display device 100 may comprise components, such as a wireless communication unit 110, an Audio/Video (NV) input unit 120, a user input unit 130, a sensing unit 140, an output unit 150, a memory 160, an interface unit 170, a controller 180, a power supply 190 and the like. FIG. 1 shows the display device 100 having various components, but it is understood that implementing all of the illustrated components is not a requirement. Greater or fewer components may alternatively be implemented.

Hereinafter, each component is described in sequence.

The wireless communication unit 110 may typically include one or more modules which permit wireless communications between the display device 100 and a wireless communication system or between the display device 100 and a network within which the display device 100 is located. For example, the wireless communication unit 110 may include at least one of a broadcast receiving module 111, a mobile communication module 112, a wireless Internet module 113, a short-range communication module 114, a location information module 115 and the like.

The broadcast receiving module 111 receives a broadcast signal and/or broadcast associated information from an external broadcast managing entity via a broadcast channel.

The broadcast channel may include a satellite channel and a terrestrial channel. The broadcast managing entity may indicate a server which generates and transmits a broadcast signal and/or broadcast associated information or a server which receives a pre-generated broadcast signal and/or broadcast associated information and sends them to the display device. The broadcast signal may be implemented as a TV broadcast signal, a radio broadcast signal, and a data broadcast signal, among others. The broadcast signal may further include a data broadcast signal combined with a TV or radio broadcast signal.

Examples of broadcast associated information may include information associated with a broadcast channel, a broadcast program, a broadcast service provider, and the like. The broadcast associated information may be provided via a mobile communication network, and received by the mobile communication module 112.

The broadcast associated information may be implemented in various formats. For instance, broadcast associated information may include Electronic Program Guide (EPG) of Digital Multimedia Broadcasting (DMB), Electronic Service Guide (ESG) of Digital Video Broadcast-Handheld (DVB-H), and the like.

The broadcast receiving module 111 may be configured to receive digital broadcast signals transmitted from various types of broadcast systems. Such broadcast systems may include Digital Multimedia Broadcasting-Terrestrial (DMB-T), Digital Multimedia Broadcasting-Satellite (DMB-S), Media Forward Link Only (MediaFLO), Digital Video Broadcast-Handheld (DVB-H), Integrated Services Digital Broadcast-Terrestrial (ISDB-T) and the like. The broadcast receiving module 111 may be configured to be suitable for every broadcast system transmitting broadcast signals as well as the digital broadcasting systems.

Broadcast signals and/or broadcast associated information received via the broadcast receiving module 111 may be stored in a suitable device, such as a memory 160.

The mobile communication module 112 transmits/receives wireless signals to/from at least one of network entities (e.g., base station, an external display device, a server, etc.) on a mobile communication network. Here, the wireless signals may include audio call signal, video (telephony) call signal, or various formats of data according to transmission/reception of text/multimedia messages.

The mobile communication module 112 may implement a video call mode and a voice call mode. The video call mode indicates a state of calling with watching a callee's image. The voice call mode indicates a state of calling without watching the callee's image. The wireless communication module 112 may transmit and receive at least one of voice and image in order to implement the video call mode and the voice call mode.

The wireless Internet module 113 supports wireless Internet access for the display device. This module may be internally or externally coupled to the display device 100. Examples of such wireless Internet access may include Wireless LAN (WLAN) (Wi-Fi), Wireless Broadband (Wibro), Worldwide Interoperability for Microwave Access (Wimax), High Speed Downlink Packet Access (HSDPA) and the like.

The short-range communication module 114 denotes a module for short-range communications. Suitable technologies for implementing this module may include BLUETOOTH™, Radio Frequency IDentification (RFID), Infrared Data Association (IrDA), Ultra-WideBand (UWB), ZigBee™, Near Field Communication (NFC) and the like.

The location information module 115 denotes a module for detecting or calculating a position of a display device. An example of the location information module 115 may include a Global Position System (GPS) module.

Still referring to FIG. 1, the A/V input unit 120 is configured to provide audio or video signal input to the display device. The A/V input unit 120 may include a camera 121 and a microphone 122. The camera 121 receives and processes image frames of still pictures or video obtained by image sensors in a video call mode or a capturing mode. The processed image frames may be displayed on a display unit 151.

The image frames processed by the camera 121 may be stored in the memory 160 or transmitted to the exterior via the wireless communication unit 110. Also, user's position information and the like may be calculated from the image frames acquired by the camera 121. Two or more cameras 121 may be provided according to the configuration of the display device.

The microphone 122 may receive an external audio signal while the display device is in a particular mode, such as a phone call mode, a recording mode, a voice recognition mode, or the like. This audio signal is processed into digital data. The processed digital data is converted for output into a format transmittable to a mobile communication base station via the mobile communication module 112 in case of the phone call mode. The microphone 122 may include assorted noise removing algorithms to remove noise generated in the course of receiving the external audio signal.

The user input unit 130 may generate input data input by a user to control the operation of the display device. The user input unit 130 may include a keypad, a dome switch, a touchpad (e.g., static pressure/capacitance), a jog wheel, a jog switch and the like.

The sensing unit 140 provides status measurements of various aspects of the display device. For instance, the sensing unit 140 may detect an open/close status of the display device, a change in a location of the display device 100, a presence or absence of user contact with the display device 100, the location of the display device 100, acceleration/deceleration of the display device 100, and the like, so as to generate a sensing signal for controlling the operation of the display device 100. For example, regarding a slide-type display device, the sensing unit 140 may sense whether a sliding portion of the display device is open or closed. Other examples include sensing functions, such as the sensing unit 140 sensing the presence or absence of power provided by the power supply 190, the presence or absence of a coupling or other connection between the interface unit 170 and an external device.

The output unit 150 is configured to output an audio signal, a video signal or a tactile signal. The output unit 150 may include a display unit 151, an audio output module 153, an alarm unit 154 and a haptic module 155.

The display unit 151 may output information processed in the display device 100. For example, when the display device is operating in a phone call mode, the display unit 151 will provide a User Interface (UI) or a Graphic User Interface (GUI), which includes information associated with the call. As another example, if the display device is in a video call mode or a capturing mode, the display unit 151 may additionally or alternatively display images captured and/or received, UI, or GUI.

The display unit 151 may be implemented using, for example, at least one of a Liquid Crystal Display (LCD), a Thin Film Transistor-Liquid Crystal Display (TFT-LCD), an Organic Light-Emitting Diode (OLED), a flexible display, a three-dimensional (3D) display, an e-ink display or the like.

Some of such displays 151 may be implemented as a transparent type or an optical transparent type through which the exterior is visible, which is referred to as 'transparent display'. A representative example of the transparent display may include a Transparent OLED (TOLED), and the like. The rear surface of the display unit 151 may also be implemented to be optically transparent. Under this configuration, a user can view an object positioned at a rear side of a terminal body through a region occupied by the display unit 151 of the terminal body.

The display unit 151 may be implemented in two or more in number according to a configured aspect of the display device 100. For instance, a plurality of the displays 151 may be arranged on one surface to be spaced apart from or integrated with each other, or may be arranged on different surfaces.

The display unit 151 may also be implemented as a stereoscopic display unit 152 for displaying stereoscopic images.

Here, the stereoscopic image may be a three-dimensional (3D) stereoscopic image, and the 3D stereoscopic image is an image refers to an image making a viewer feel that a gradual depth and reality of an object on a monitor or a screen is the same as a reality space. A 3D stereoscopic image is implemented by using binocular disparity. Binocular disparity refers to disparity made by the positions of two eyes. When two eyes view different 2D images, the images are transferred to the brain through the retina and combined in the brain to provide the perception of depth and reality sense.

The stereoscopic display unit 152 may employ a stereoscopic display scheme such as stereoscopic scheme (a glass scheme), an auto-stereoscopic scheme (glassless scheme), a projection scheme (holographic scheme), or the like. Stereoscopic schemes commonly used for home television receivers, or the like, include Wheatstone stereoscopic scheme, or the like.

The auto-stereoscopic scheme includes, for example, a parallax barrier scheme, a lenticular scheme, an integral imaging scheme, or the like. The projection scheme includes a reflective holographic scheme, a transmissive holographic scheme, or the like.

In general, a 3D stereoscopic image is comprised of a left image (a left eye image) and a right image (a right eye image). According to how left and right images are combined into a 3D stereoscopic image, the 3D stereoscopic imaging method is divided into a top-down method in which left and right images are disposed up and down in a frame, an L-to-R (left-to-right, side by side) method in which left and right images are disposed left and right in a frame, a checker board method in which fragments of left and right images are disposed in a tile form, an interlaced method in which left and right images are alternately disposed by columns and rows, and a time sequential (or frame by frame) method in which left and right images are alternately displayed by time.

Also, as for a 3D thumbnail image, a left image thumbnail and a right image thumbnail are generated from a left image and a right image of the original image frame, respectively, and then combined to generate a single 3D thumbnail image. In general, thumbnail refers to a reduced image or a reduced still image. The thusly generated left image thumbnail and the right image thumbnail are displayed with a horizontal distance difference therebetween by a depth corresponding to the disparity between the left image and the right image on the screen, providing a stereoscopic space sense.

As illustrated, a left image and a right image required for implementing a 3D stereoscopic image is displayed on the stereoscopic display unit 152 by a stereoscopic processing unit (not shown). The stereoscopic processing unit may receive the 3D image and extract the left image and the right image, or may receive the 2D image and change it into a left image and a right image.

Here, if the display unit 151 and a touch sensitive sensor (referred to as a touch sensor) have a layered structure therebetween (referred to as a 'touch screen'), the display unit 151 may be used as an input device as well as an output device. The touch sensor may be implemented as a touch film, a touch sheet, a touchpad, and the like.

The touch sensor may be configured to convert changes of a pressure applied to a specific part of the display unit 151, or a capacitance occurring from a specific part of the display unit 151, into electric input signals. Also, the touch sensor may be configured to sense not only a touched position and a touched area, but also touch pressure. Here, a touch object is an object to apply a touch input onto the touch sensor. Examples of the touch object may include a finger, a touch pen, a stylus pen, a pointer or the like.

When touch inputs are sensed by the touch sensors, corresponding signals are transmitted to a touch controller. The touch controller processes the received signals, and then transmits corresponding data to the controller 180. Accordingly, the controller 180 may sense which region of the display unit 151 has been touched.

Still referring to FIG. 1, a proximity sensor 141 may be arranged at an inner region of the display device 100 covered by the touch screen, or near the touch screen. The proximity sensor 141 may be provided as one example of the sensing unit 140. The proximity sensor 141 indicates a sensor to sense presence or absence of an object approaching to a surface to be sensed, or an object disposed near a surface to be sensed, by using an electromagnetic field or infrared rays without a mechanical contact. The proximity sensor 141 has a longer lifespan and a more enhanced utility than a contact sensor.

The proximity sensor 141 may include a transmissive type photoelectric sensor, a direct reflective type photoelectric sensor, a mirror reflective type photoelectric sensor, a high-frequency oscillation proximity sensor, a capacitance type proximity sensor, a magnetic type proximity sensor, an infrared rays proximity sensor, and so on. When the touch screen is implemented as a capacitance type, proximity of a pointer to the touch screen is sensed by changes of an electromagnetic field. In this case, the touch screen (touch sensor) may be categorized into a proximity sensor.

Hereinafter, for the sake of brief explanation, a status that the pointer is positioned to be proximate onto the touch screen without contact will be referred to as 'proximity touch', whereas a status that the pointer substantially comes in contact with the touch screen will be referred to as 'contact touch'. For the position corresponding to the proximity touch of the pointer on the touch screen, such position corresponds to a position where the pointer faces perpendicular to the touch screen upon the proximity touch of the pointer.

The proximity sensor 141 senses proximity touch, and proximity touch patterns (e.g., distance, direction, speed, time, position, moving status, etc.). Information relating to the sensed proximity touch and the sensed proximity touch patterns may be output onto the touch screen.

When a touch sensor is overlaid on the stereoscopic display unit 152 in a layered manner (hereinafter, referred to as 'stereoscopic touch screen'), or when the stereoscopic display unit 152 and a 3D sensor sensing a touch operation are combined, the stereoscopic display unit 152 may also be used as a 3D input device.

As examples of the 3D sensor, the sensing unit 140 may include a proximity sensor 141, a stereoscopic touch sensing unit 142, an ultrasonic sensing unit 143, and a camera sensing unit 144.

The proximity sensor 141 detects the distance between a sensing object (e.g., the user's finger or a stylus pen) applying a touch by using the force of electromagnetism or infrared rays without a mechanical contact and a detect surface. By using the distance, the terminal recognizes which portion of a stereoscopic image has been touched. In particular, when the touch screen is an electrostatic touch screen, the degree of proximity of the sensing object is detected based on a change of an electric field according to proximity of the sensing object, and a touch to the 3D image is recognized by using the degree of proximity.

The stereoscopic touch sensing unit 142 is configured to detect the strength or duration of a touch applied to the touch screen. For example, the stereoscopic touch sensing unit 142 may sense touch pressure. When the pressure is strong, it may recognize the touch as a touch with respect to an object located farther away from the touch screen toward the inside of the terminal.

The ultrasonic sensing unit 143 is configured to recognize position information of the sensing object by using ultrasonic waves.

The ultrasonic sensing unit 143 may include, for example, an optical sensor and a plurality of ultrasonic sensors. The optical sensor is configured to sense light and the ultrasonic sensors may be configured to sense ultrasonic waves. Since light is much faster than ultrasonic waves, a time for which the light reaches the optical sensor is much shorter than a time for which the ultrasonic wave reaches the ultrasonic sensor. Therefore, a position of a wave generation source may be calculated by using a time difference from the time that the ultrasonic wave reaches based on the light as a reference signal.

The camera sensing unit 144 includes at least one of a camera, a photo sensor, and a laser sensor.

For example, the camera and the laser sensor may be combined to detect a touch of the sensing object with respect to a 3D stereoscopic image. When distance information detected by a laser sensor is added to a 2D image captured by the camera, 3D information can be obtained.

In another example, a photo sensor may be laminated on the display device. The photo sensor is configured to scan a movement of an object in proximity to the touch screen. In detail, the photo sensor includes photo diodes and transistors at rows and columns to scan content mounted on the photo sensor by using an electrical signal changing according to the quantity of applied light. Namely, the photo sensor calculates the coordinates of the object according to variation of light to thus obtain position information of the sensing object.

The audio output module 153 may convert and output as sound audio data received from the wireless communication unit 110 or stored in the memory 160 in a call signal reception mode, a call mode, a record mode, a voice recognition mode, a broadcast reception mode, and the like. Also, the audio output module 153 may provide audible outputs related to a particular function performed by the display device 100 (e.g., a call signal reception sound, a message reception sound, etc.). The audio output module 153 may include a speaker, a buzzer or the like.

The alarm unit 154 outputs a signal for informing about an occurrence of an event of the display device 100. Events generated in the display device may include call signal reception, message reception, key signal inputs, a touch input etc. In addition to video or audio signals, the alarm unit 154 may output signals in a different manner, for example, using vibration to inform about an occurrence of an event. The video or audio signals may be also outputted via the audio output module 153, so the display unit 151 and the audio output module 153 may be classified as parts of the alarm unit 154.

The haptic module 155 generates various tactile effects the user may feel. A typical example of the tactile effects generated by the haptic module 155 is vibration. The strength and pattern of the haptic module 155 can be controlled. For example, different vibrations may be combined to be outputted or sequentially outputted.

Besides vibration, the haptic module 155 may generate various other tactile effects such as an effect by stimulation such as a pin arrangement vertically moving with respect to a contact skin, a spray force or suction force of air through a jet orifice or a suction opening, a contact on the skin, a contact of an electrode, electrostatic force, etc., an effect by reproducing the sense of cold and warmth using an element that can absorb or generate heat.

The haptic module 155 may be implemented to allow the user to feel a tactile effect through a muscle sensation such as fingers or arm of the user, as well as transferring the tactile effect through a direct contact. Two or more haptic modules 155 may be provided according to the configuration of the display device 100.

The memory 160 may store software programs used for the processing and controlling operations performed by the controller 180, or may temporarily store data (e.g., a phonebook, messages, still images, video, etc.) that are inputted or outputted. In addition, the memory 160 may store data regarding various patterns of vibrations and audio signals outputted when a touch is inputted to the touch screen.

The memory 160 may include at least one type of storage medium including a Flash memory, a hard disk, a multimedia card micro type, a card-type memory (e.g., SD or DX memory, etc), a Random Access Memory (RAM), a Static Random Access Memory (SRAM), a Read-Only Memory (ROM), an Electrically Erasable Programmable Read-Only Memory (EEPROM), a Programmable Read-Only memory (PROM), a magnetic memory, a magnetic disk, and an optical disk. Also, the display device 100 may be operated in relation to a web storage device that performs the storage function of the memory 160 over the Internet.

The interface unit 170 serves as an interface with every external device connected with the display device 100. For example, the external devices may transmit data to an external device, receives and transmits power to each element of the display device 100, or transmits internal data of the display device 100 to an external device. For example, the interface unit 170 may include wired or wireless headset ports, external power supply ports, wired or wireless data ports, memory card ports, ports for connecting a device having an identification module, audio input/output (I/O) ports, video I/O ports, earphone ports, or the like.

The identification module may be a chip that stores various information for authenticating the authority of using the display device 100 and may include a user identity module (UIM), a subscriber identity module (SIM) a universal subscriber identity module (USIM), and the like. In addition, the device having the identification module (referred to as 'identifying device', hereinafter) may take the form of a smart card. Accordingly, the identifying device may be connected with the terminal 100 via the interface unit 170.

When the display device 100 is connected with an external cradle, the interface unit 170 may serve as a passage to allow power from the cradle to be supplied therethrough to the display device 100 or may serve as a passage to allow various command signals inputted by the user from the cradle to be transferred to the display device therethrough. Various command signals or power inputted from the cradle may operate as signals for recognizing that the display device is properly mounted on the cradle.

The controller 180 typically controls the general operations of the display device. For example, the controller 180 performs controlling and processing associated with voice calls, data communications, video calls, and the like. The controller 180 may include a multimedia module 181 for reproducing multimedia data. The multimedia module 181 may be configured within the controller 180 or may be configured to be separated from the controller 180.

The controller 180 may perform a pattern recognition processing to recognize a handwriting input or a picture drawing input performed on the touch screen as characters or images, respectively.

Also, the controller 180 may execute a lock state to restrict a user from inputting control commands for applications when a state of the display device meets a preset condition. Also, the controller 180 may control a lock screen displayed in the lock state based on a touch input sensed on the display unit 151 in the lock state of the display device.

The power supply unit 190 receives external power or internal power and supplies appropriate power required for operating respective elements and components under the control of the controller 180.

Various embodiments described herein may be implemented in a computer-readable or its similar medium using, for example, software, hardware, or any combination thereof.

For hardware implementation, the embodiments described herein may be implemented by using at least one of application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic units designed to perform the functions described herein. In some cases, such embodiments may be implemented by the controller 180 itself.

For software implementation, the embodiments such as procedures or functions described herein may be implemented by separate software modules. Each software module may perform one or more functions or operations described herein.

Software codes can be implemented by a software application written in any suitable programming language. The software codes may be stored in the memory 160 and executed by the controller 180.

Hereinafter, a communication system which is operable with the display device 100 according to the present disclosure will be described.

Figure 2A:
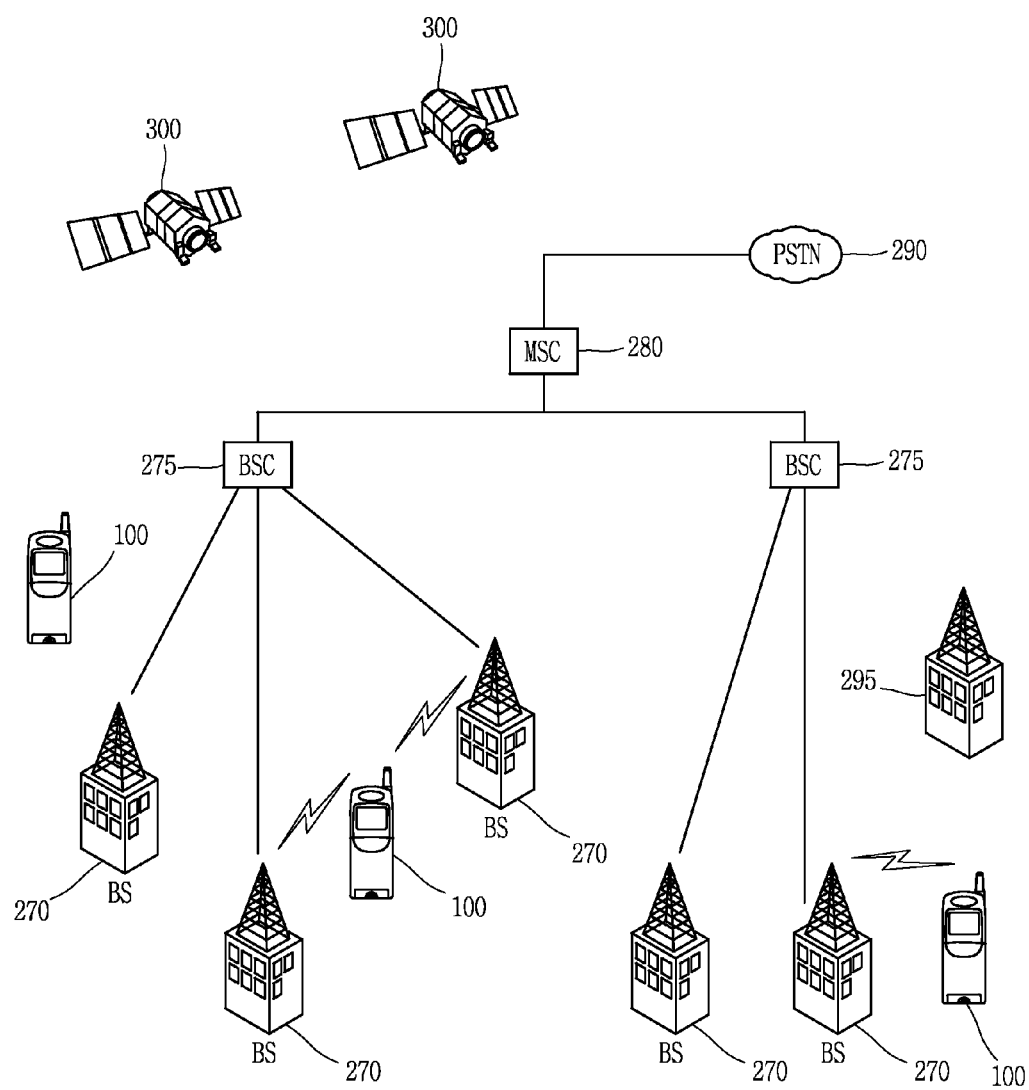
FIGS. 2A and 2B are diagrams illustrating a telecommunication system in which the display device according to the present invention can operate.
Figure 2B:
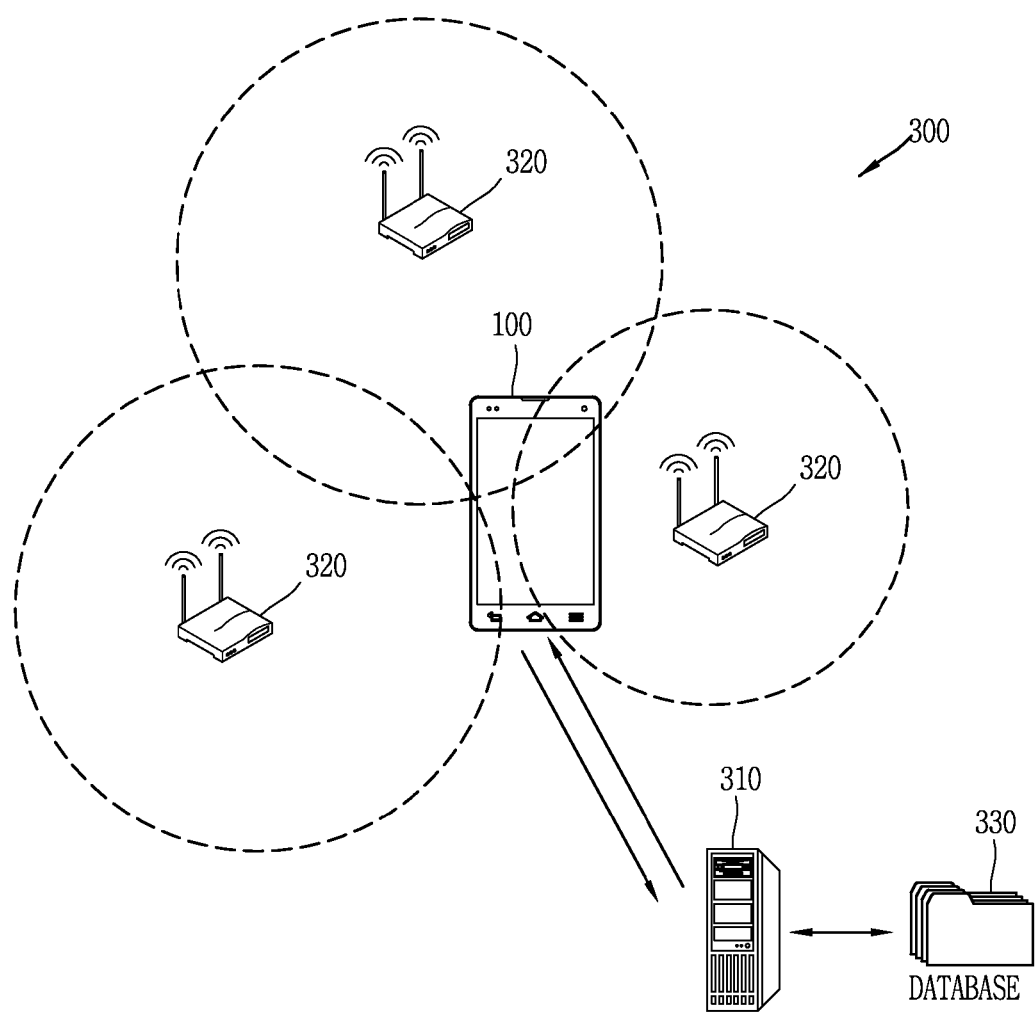

FIGS. 2A and 2B are conceptual views of a communication system operable with a display device 100 in accordance with the present disclosure.

First, referring to FIG. 2A, such communication systems utilize different air interfaces and/or physical layers. Examples of such air interfaces utilized by the communication systems include Frequency Division Multiple Access (FDMA), Time Division Multiple Access (TDMA), Code Division Multiple Access (CDMA), and Universal Mobile Telecommunications System (UMTS), the Long Term Evolution (LTE) of the UMTS, the Global System for Mobile Communications (GSM), and the like.

By way of non-limiting example only, further description will relate to a CDMA communication system, but such teachings apply equally to other system types including the CDMA wireless communication system.

Referring now to FIG. 2A, a CDMA wireless communication system is shown having a plurality of display devices 100, a plurality of base stations (BSs) 270, base station controllers (BSCs) 275, and a mobile switching center (MSC) 280. The MSC 280 is configured to interface with a conventional Public Switch Telephone Network (PSTN) 290. The MSC 280 is also configured to interface with the BSCs 275. The BSCs 275 are coupled to the base stations 270 via backhaul lines. The backhaul lines may be configured in accordance with any of several known interfaces including, for example, E1/T1, ATM, IP, PPP, Frame Relay, HDSL, ADSL, or xDSL. Hence, the plurality of BSCs 275 can be included in the system as shown in FIG. 2A.

Each base station 270 may include one or more sectors, each sector having an omni-directional antenna or an antenna pointed in a particular direction radially away from the base station 270. Alternatively, each sector may include two or more different antennas. Each base station 270 may be configured to support a plurality of frequency assignments, with each frequency assignment having a particular spectrum (e.g., 1.25 MHz, 5 MHz, etc.).

The intersection of sector and frequency assignment may be referred to as a CDMA channel. The base stations 270 may also be referred to as Base Station Transceiver Subsystems (BTSs). In some cases, the term "base station" may be used to refer collectively to a BSC 275, and one or more base stations 270. The base stations may also be denoted as "cell sites." Alternatively, individual sectors of a given base station 270 may be referred to as cell sites.

A broadcasting transmitter (BT) 295, as shown in FIG. 2A, transmits a broadcast signal to the display devices 100 operating within the system. The broadcast receiving module 111 (FIG. 1B) is typically configured inside the display device 100 to receive broadcast signals transmitted by the BT 295.

FIG. 2A further depicts several Global Positioning System (GPS) satellites 300. Such satellites 300 facilitate locating the position of at least one of plural display devices 100. Two satellites are depicted in FIG. 2, but it is understood that useful position information may be obtained with greater or fewer satellites than two satellites. The GPS module 115 (FIG. 1) is typically configured to cooperate with the satellites 300 to obtain desired position information. It is to be appreciated that other types of position detection technology, (i.e., location technology that may be used in addition to or instead of GPS location technology) may alternatively be implemented. If desired, at least one of the GPS satellites 300 may alternatively or additionally be configured to provide satellite DMB transmissions.

During typical operation of the wireless communication system, the base stations 270 receive sets of reverse-link signals from various display devices 100. The display devices 100 are engaging in calls, messaging, and executing other communications. Each reverse-link signal received by a given base station 270 is processed within that base station 270. The resulting data is forwarded to an associated BSC 275. The BSC 275 provides call resource allocation and mobility management functionality including the orchestration of soft handoffs between base stations 270. The BSCs 275 also route the received data to the MSC 280, which then provides additional routing services for interfacing with the PSTN 290. Similarly, the PSTN 290 interfaces with the MSC 280, and the MSC 280 interfaces with the BSCs 275, which in turn control the base stations 270 to transmit sets of forward-link signals to the display devices 100.

Hereinafter, description will be given of a method for acquiring location information of a display device using a wireless fidelity (WiFi) positioning system (WPS), with reference to FIG. 2B.

The WiFi positioning system (WPS) refers to a location determination technology based on a wireless local area network (WLAN) using WiFi as a technology for tracking the location of the display device 100 using a WiFi module provided in the display device 100 and a wireless access point 320 for transmitting and receiving to and from the WiFi module.

The WiFi positioning system may include a WiFi location determination server 310, a display device 100, a wireless access point (AP) 320 connected to the display device 100, and a database 330 stored with any wireless AP information.

The WiFi location determination server 310 extracts the information of the wireless AP 320 connected to the display device 100 based on a location information request message (or signal) of the display device 100. The information of the wireless AP 320 may be transmitted to the WiFi location determination server 310 through the display device 100 or transmitted to the WiFi location determination server 310 from the wireless AP 320.

The information of the wireless AP extracted based on the location information request message of the display device 100 may be at least one of MAC address, SSID, RSSI, channel information, privacy, network type, signal strength and noise strength.

The WiFi location determination server 310 receives the information of the wireless AP 320 connected to the display device 100 as described above, and compares the received wireless AP 320 information with information contained in the pre-established database 330 to extract (or analyze) the location information of the display device 100.

On the other hand, referring to FIG. 2B, as an example, the wireless AP connected to the display device 100 is illustrated as a first, a second, and a third wireless AP 320. However, the number of wireless APs connected to the display device 100 may be changed in various ways according to a wireless communication environment in which the display device 100 is located. When the display device 100 is connected to at least one of wireless APs, the WiFi positioning system can track the location of the display device 100.

Next, considering the database 330 stored with any wireless AP information in more detail, various information of any wireless APs disposed at different locations may be stored in the database 330.

The information of any wireless APs stored in the database 330 may be information such as MAC address, SSID, RSSI, channel information, privacy, network type, latitude and longitude coordinate, building at which the wireless AP is located, floor number, detailed indoor location information (GPS coordinate available), AP owner's address, phone number, and the like.

In this manner, any wireless AP information and location information corresponding to the any wireless AP are stored together in the database 330, and thus the WiFi location determination server 310 may retrieve wireless AP information corresponding to the information of the wireless AP 320 connected to the display device 100 from the database 330 to extract the location information matched to the searched wireless AP, thereby extracting the location information of the display device 100.

Furthermore, the extracted location information of the display device 100 may be transmitted to the display device 100 through the WiFi location determination server 310, thereby acquiring the location information of the display device 100.

On the other hand, according to the present invention, information that is processed in a display device 100 is displayed using a transparent display, for example, TOLED.

At this point, the "transparency" that is hereinafter referred to indicates the extent to which an object that is output to or displayed on a transparent display unit 151 is transparent. The higher (or the more increased) the transparency, the better a background object in the background is seen, and the lower (or the more decreased) the transparency, the less the background object in the background is seen.

In addition, the "transparency mode" that is hereinafter referred to indicates a screen state in which an object in the background which is covered by an execution screen or a specific object that is output to the transparent display unit 151 is seen well.

In addition, the "non-transparency mode" that is hereinafter referred to indicates a screen state in which an object in the background which is covered by an execution screen or a specific object that is output to the transparent display unit 151 is not seen.

Figure 3:
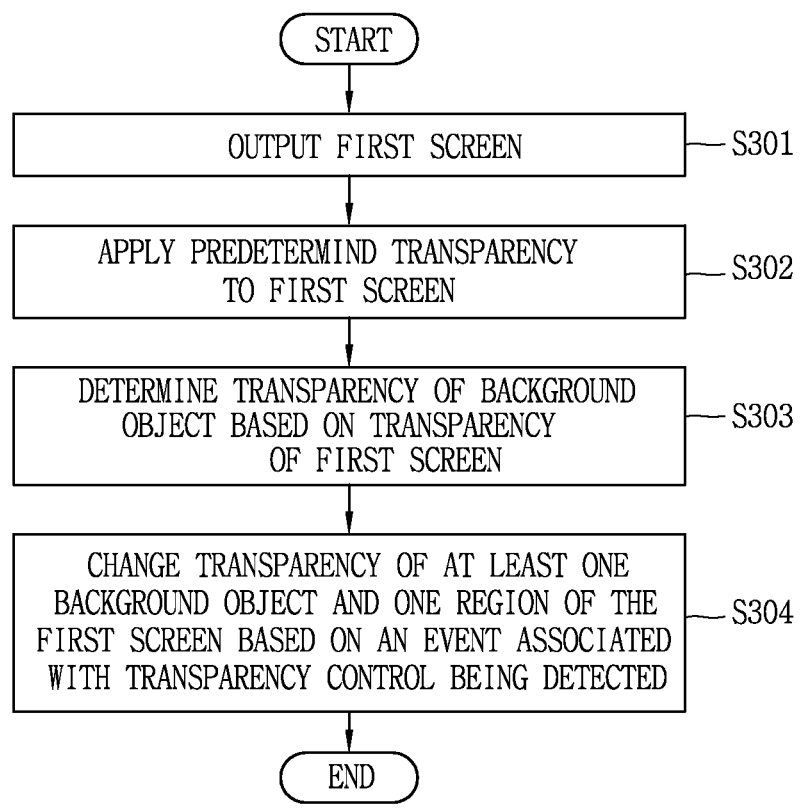
FIG. 3 is a flowchart for describing a method of controlling the display device according to an embodiment of the present invention.
Figure 4A:
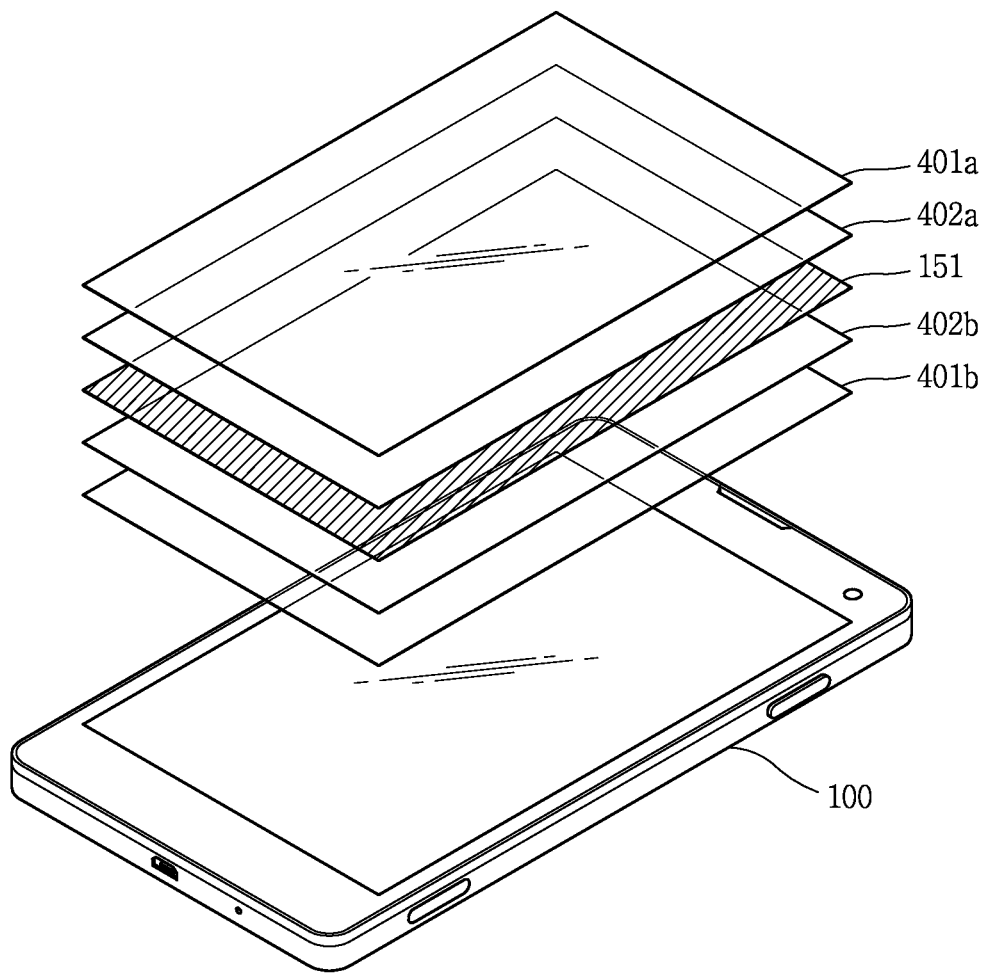
FIG. 4A and FIG. 4B are diagrams for describing the flowchart in FIG. 3.
Figure 4B:
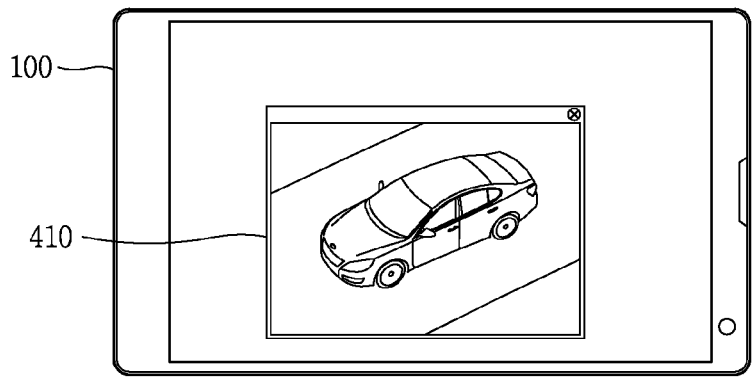
Figure 4B:
Figure 4B:
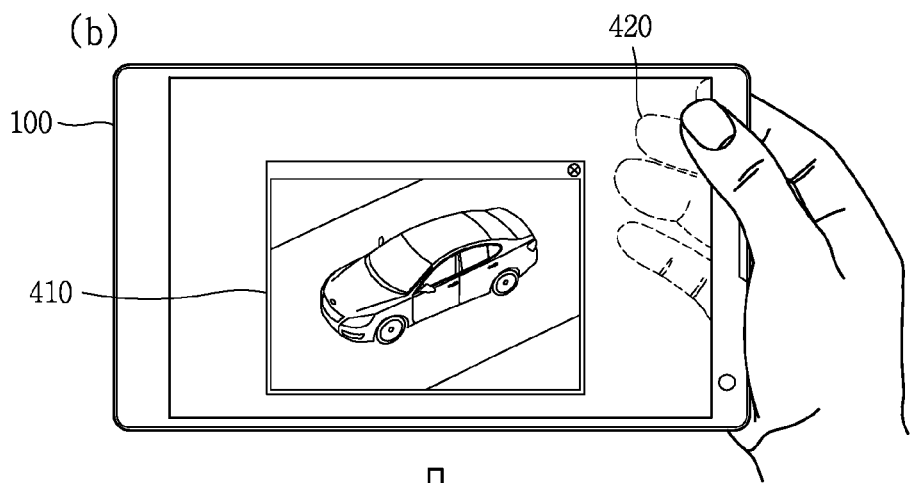
Figure 4B:
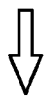
Figure 4B:
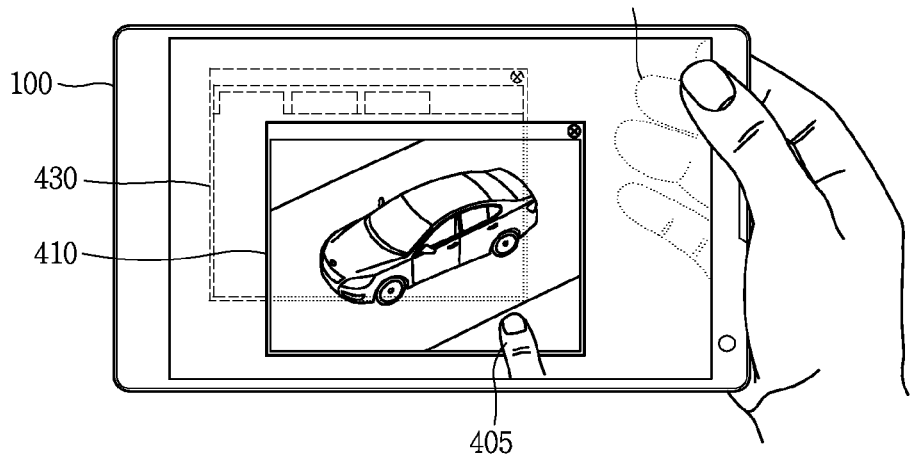

FIG. 3 is a flowchart for describing a method of controlling a display device according to an embodiment of the present invention. FIGS. 4A and 4B are diagrams for describing the flowchart in FIG. 3.

First, a display device 100 according to the embodiment of the present invention outputs a first screen in the foreground to the transparent display unit 151 (S301). There is no limit to a type of the first screen that is output to the foreground. For example, the first screen is an execution screen of a specific application (for example, a moving-image reproduction screen, an album, a web page, and the like). Alternatively, the first screen is an idle screen that includes multiple icons or is a locked screen that limits input of a control command to an application.

Referring to FIG. 4A, first and second touch pads 401a and 401b and first and second selective light-penetration members 402a and 402b overlap on a front surface and a rear surface of the transparent display unit 151 of the display device 100 according to the embodiment of the present invention, in such a manner as to have a layered structure. The selective light-penetration members 402a and 402b are, for example, variable transparent electrode films, each of which uses a solar battery and a polymeric membrane or a graphene film.

In addition, as illustrated in FIG. 4A, the selective light-penetration members 402a and 402b are configured such that they are positioned to have an overlapping structure with the transparent display unit 151 in between. The selective light-penetration members 402a and 402b are realized as being transparent like the transparent display 151 or as being different in color from that of the transparent display 151. In addition, the touch pads 401a and 401b overlap the transparent display unit 151 a layered structure, and thus the transparent display unit 151 operates as a touch screen. This enables information to be input by a user's touch. Such touch pads 401a and 401b are configured to be positioned with the transparent display unit 151 in between or are configured to be positioned with the selective light-penetration members 402a and 402b.

In addition, although not illustrated, the display device 100 may include first and second display units. In this structure, only the first display unit is the transparent display unit or both of the first and second display units are the transparent display units.

In addition, although not illustrated, the display unit 151 of the display device 100 may be configured to have a structure in which the transparent display unit and the flexible display unit are layered or to have a structure in which a transparent display circuit is superimposed onto an electronic-ink (E-Ink) panel.

In this manner, the controller 180 applies predetermined transparency to the first screen in a state in which the first screen is output. To do this, the transparency of the screen that is executed in the foreground on the transparent display unit 151 is set in advance, based on a user's input or according to a predetermined condition. The lower transparency is set for the first screen, the more a different execution screen or an image of the background object is covered and thus the less the different execution screen or the image of the background object is seen. In contrast, the higher transparency is set for the first screen, the less the different execution screen or the image of the background object is covered and thus the better the different execution screen or the image of the background object is seen.

For example, when a menu for setting the transparency of the first screen is popped up on one region of the transparent display unit 151, a transparency setting mode for the first screen is entered by inputting a key included in the menu. Then, the user can set the transparency of the first screen by selecting desired transparency using a screen that appears in the transparency setting mode or by directly inputting the desired transparency.

The transparency of the first screen that is set through the setting unit 135 is stored in the memory 160. In addition, when the transparency of the first screen is changed, the memory 160 is updated with the changed transparency, and a history of pre-change transparency values also is stored in the memory 160. Thus, the pre-change transparency values can be applied in a similar situation or state.

In this manner, when the transparency of the first screen is set, the controller 180 applies the predetermined transparency to the first screen (S302).

For example, FIG. 4B(a) illustrates that a moving image screen 410 to which the predetermined transparency is applied is output in the foreground to the transparent display unit 151. The moving image screen 410 that is output in the foreground is output to all regions of the transparent display unit 151, and as illustrated in FIG. 4B(a), is output in the form of a pop-up window to one region of the transparent display unit 151. At this point, the higher the predetermined transparency of the first screen, the lower the clearness of the first screen. The lower the transparency of the first screen, the clearer the screen.

Then, based on the transparency of the first screen, the controller 180 determines the transparency of the background object that is seen through the transparent display unit 151 (S303).

Specifically, a greater transparency value is applied to the transparency of the background object that is seen through the transparent display unit 151 than to the transparency that is set to the first screen. When this is done, the first screen that is executed on the transparent display unit 151 is high in clearness, and the background object that is illuminated from behind the transparent display unit 151 is low in clearness. Thus, visibility of the first screen is improved.

For example, if a user's hand 420 is seen through the transparent display unit 151 as illustrated in FIG. 4B(b), a higher transparency value is applied to the transparency of the user's hand than to the transparency that is applied to a moving image screen 410 that is executed on the transparent display unit 151. Accordingly, the user is provided with a clearer screen in a transparent display state when viewing the moving image screen 410.

To do this, the controller 180 recognizes both coordinates of a region to which the first screen is output and coordinates of a region on which the background object that is seen through the transparent display unit 151 is displayed. Then, the controller 180 outputs the first screen and the background object in such a manner that they are different in transparency from each other. This is done by differently adjusting each of amounts of three primary colors (red, green, and blue) of light that penetrate through the first screen and the background object that are output to (or displayed on) the transparent display 151. That is, transparency strength is differently adjusted by adjusting transmissivity of each of the first screen and the background object that are output to the transparent display unit 151.

In addition, by adjusting an amount of electric current supplied to the transparent display unit 151, based on the recognized coordinates-based region, the controller 180 adjusts the transparency. For example, a larger amount of electric current is supplied to the coordinates-based region to which the first screen is output, thereby increasing the clearness (or to improve the visibility) of the first screen, and a smaller amount of electric current is supplied to the coordinates-based region (a region overlapping the first screen is excluded) on which only the background object in back of the transparent display unit 151 is displayed, thereby increasing the transparency of the background object.

At this point, if the background object is added or the background object moves, the controller 180 accordingly recognizes changes in coordinates. Therefore, the background object with the same transparency as the already-applied transparency is output by continuously adjust the amounts of three primary colors of light that penetrates through the background object, based on the changed coordinates-based region.

In addition, if the first screen overlaps at least one part of the background object, the controller 180 recognizes coordinates of the overlapping one region. In such a case, the controller 180 improves the clearness by decreasing the transparency of the overlapping one region in the first screen to such an extent that a predetermined amount of transparency is extracted from the transparency of the non-overlapping region. That is, the transparency value obtained by extracting a value reduced from a predetermined transparency, is applied to a region of the first screen that overlaps at least one part of the background object in order to further improve a clearness level. In addition, the changed transparency is temporarily maintained or is continuously maintained.

On the other hand, when an event associated with transparency control of the transparency display is detected in a state where the first screen and the background object are output with different transparency (clearness) in this manner, the controller 180 changes at least the transparency of at least one of the background object or one region of the first screen (S304).

At this point, the event associated with the transparency control includes the user's input of predetermined gesture, a change in the screen of the transparent display unit 151, input of a predetermined touch, an executed state of an application, and a change in strength of light incident on the transparent display unit 151. In addition, when a predetermined condition is satisfied, the event associated with the transparency control occurs automatically or occurs through a user's operation.

For example, as illustrated in FIG. 4B(c), if a different screen, for example, a web page screen 430 according to execution of a web application is output to one region of the transparent display unit 151, the controller 180 decreases the transparency (hereinafter referred to as a "first transparency") of the moving image screen 410 that is executed in the foreground, thereby further increasing the clearness of the moving image screen 410. Alternatively, the controller 180 increases the transparency (hereinafter referred to as a "second transparency:) of the user's hand 420 that is seen through the transparency display unit 151, thereby making the user's hand 420 dimmer. Then, the transparency value (hereinafter referred to as a "third transparency") that falls between those of the first transparency and the second transparency is applied to the web page screen 430 that is output. At this point, at least one part of the web page screen 430, at least one part of the moving image screen 410, and at least one part of the user's hand 420 overlap each other. In such a case, with respect to the overlapping part, the first, second, and third transparency values maintain their respective transparency level, but the transparency values can be changed.

On the other hand, when the web page screen 430 is output in the foreground to the transparent display unit 151 and the moving image screen 410 is executed in the background, the first transparency is applied to the web page screen 430 or the transparency (or the increased clearness) reduced from the first transparency is applied to the web page screen 430. Then, the third transparency is applied to the already-output moving image screen 410, and the second transparency or the transparency value higher than that of the second transparency is applied to the user's hand 420 that is seen through the transparent display unit 151.

In addition, even though the transparency of the moving image screen 410, the web page screen 430, and the user's hand 420 is each set in this manner travel, the controller 180 recognizes changes in coordinates due to movements of the moving image screen 410, the web page screen 430 at the user's hand 420 and outputs the moving image screen 410 and the web page screen 430 to the screen with the same transparency, to the screen. In this manner, different transparency is applied and thus the screen (or the image) is output, depending on the number of the execution screens or the presence or absence of the background object in one transparency display unit 151. This enables the screen being currently viewed by the user to be most clearly seen.

On the other hand, other specific examples of events associated with the transparency control are described in detail below relating to the accompanying drawings.

As described above, the display device according to the embodiment of the present invention further improves the visibility to the user by setting the transparency of the screen of the application that is being executed on the transparent display unit and the transparency of the background screen that is seen through the transparent display unit 151, differently.

FIGS. 5A to 5D are diagrams for describing a control method of the display device 100 according to an embodiment of the present invention in which the transparency of multiple screens and multiple background objects are displayed in the transparent display unit 151 are controlled.

As described above, the predetermined transparency is applied to the first screen that is output in the foreground to the transparent display unit 151.

In addition, the transparency of the background object that is seen through the transparent display unit 151 is determined based on the transparency that is set for the first screen. That is, the controller 180 of the display device 100 applies to the background object the transparency value higher than that of the predetermined transparency that is set for the first screen.

Figure 5A:
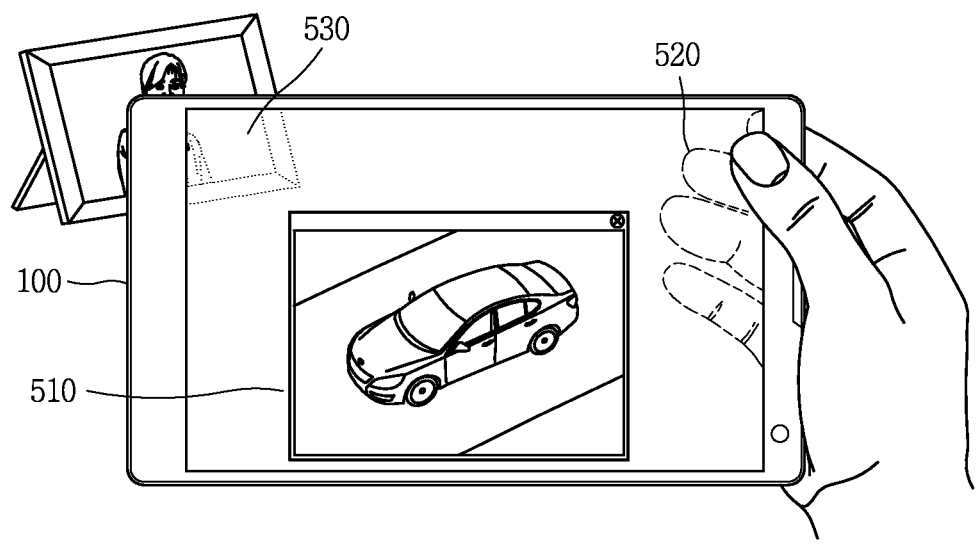
FIGS. 5A to 5D are diagrams for describing a control method of the display device according to an embodiment of the present invention in which if multiple screens and multiple background objects are displayed in the transparent display unit, the transparency of each is controlled.

The number of background objects is two or more, the controller 180 applies different transparency to each of the multiple background objects depending on how close to the display unit is, each of the multiple background objects is located For example, referring to FIG. 5A, a user's hand 520 that is located close to the back side of the transparent display unit 151 and a frame 530 that is located far from the back side of the transparent display unit 151, each with different transparency (or clearness), are output to the transparent display unit 151 in such a manner that the user can feel distances of the user's hand 520 and the frame 530 from the transparent display unit 151. To do this, the display device described in the present disclosure includes a rear camera (not illustrated) that photographs an object that is present in back of the transparent display unit 151. The controller 180 recognizes the photographed object and calculates a value of a distance from the display unit 151.

In addition, in a state where the transparency of the first screen that is output in the foreground to the transparent display unit 151 and the transparency of the background object that is seen through the transparent display unit 151 are applied differently, the controller 150 detects an event that a second screen is output in the background to the transparent display unit 151.

For example, the second screen may be an execution screen of a specific application (for example, a moving-image reproduction screen, an album, a web page, and the like). Alternatively, the second screen is an idle screen that includes multiple icons or is a locked screen that limits inputting of a control command to an application.

When the second screen is output in this manner, the controller 180 applies to the second screen the transparency value higher than that of the transparency that is set for the first screen, or decreases the transparency that is set for the first screen. Then, the transparency value higher than that of the transparency that is set for each of the first and second screens is applied to the background object. That is, the highest transparency value, the second highest transparency value, and the third highest transparency are applied to the background object, the second screen, and the first screen that are output to the transparent display unit 151, respectively. Thus, the clearness of the first screen that is executed in the foreground, which is currently viewed by the user, becomes the highest, thereby improving the visibility.

Figure 5B:
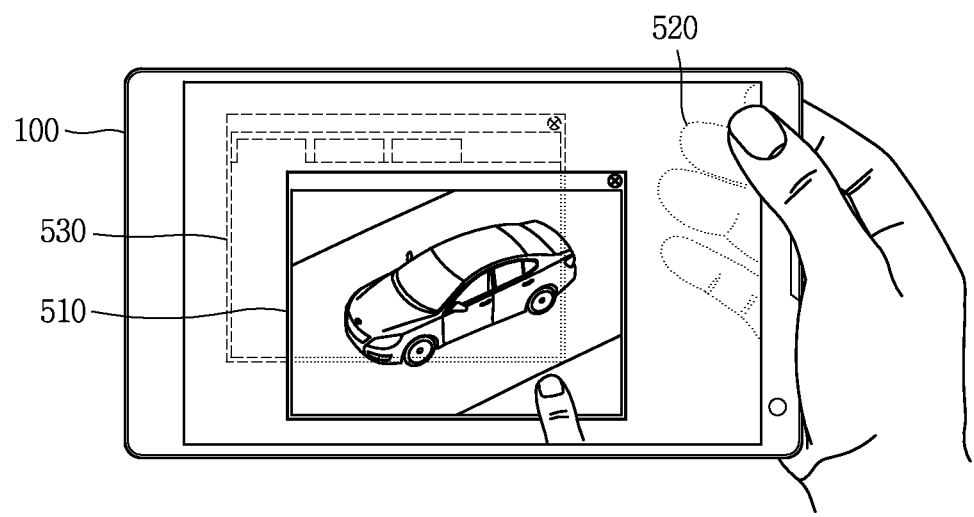

For example, referring to FIG. 5B, the lowest transparency (hereinafter referred to as the "first transparency") is applied to a moving image screen 510 that is executed in the foreground on the transparent display unit 151, the middle-level transparency (hereinafter referred to as the "second transparency") is applied to a web page screen 530, and the highest transparency (hereinafter referred to as the "third transparency") is applied to the user's hand 520 that is seen through the transparent display unit 151. Therefore, the user is provided with further-improved visibility in viewing the moving image screen 510.

On the other hand, when two or more second screens are output in the background to the transparent display unit 151 is two or more, the controller 180 applies the transparency, beginning with applying the highest transparency to a screen that corresponds to an application that has been executed most previously, and ending with applying the lowest transparency to a screen that corresponds to an application that has been most recently. That is, the lowest transparency (that is, the highest clearness) is applied to the execution screen that the user currently views and the highest transparency (that is the lowest clearness) is applied to the execution screen that the user has viewed most previously.

In addition, in such a state, the controller 180 applies higher transparency to the background object that is seen through the transparent display unit 151 than to the screen that has been executed most previously. Therefore, the image of the background object is output with the lowest clearness to the transparent display unit 151.

Figure 5C:
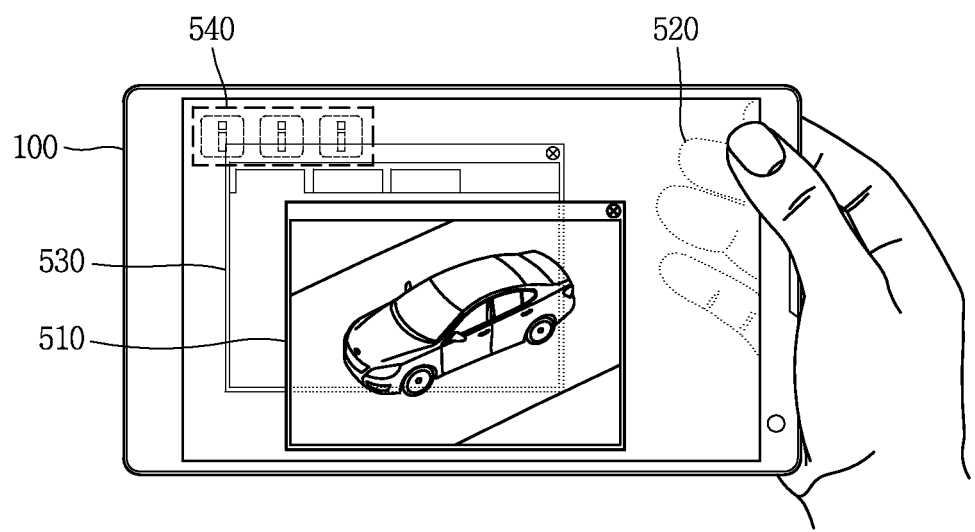

For example, referring to FIG. 5C, a first transparency (the highest clearness) is applied to the moving image screen 510 that is output in the foreground to the transparent display unit 151 with transparencies, beginning with the next lowest transparency and ending with the highest transparency, is applied to the web page screens 530, beginning with the most-previously viewed web page screen and ending with the most-recently viewed web page screen, and to icons 540 that are output on the background of the corresponding web page screen 530. That is, the web page screen 530 has higher transparency than the moving image screen 510, but lower transparency than the icons 540. Then, the highest transparency is applied to the user's hand 520 that is seen through the transparent display unit 151.

On the other hand, in another example, adjustments are made such that the first transparency is applied to the moving image screen 510 that the user currently views, a second transparency is applied to all execution screens (for example, the web page screen 530 and the icons 540) of another application, and a third transparency is applied to the user's hand 520 that is seen through the transparent display unit 151.

In a state in which multiple screens in the background and the screen in the foreground are output with different transparency to the display unit 151, the user can switch execution screens corresponding to the foreground and the background. The touch input is a short-touch input with respect to a screen that is executed in the background or is a touch input with respect to a menu that is displayed on a status bar.

Specifically, as described above, when an event is detected for status switching of the first screen executed in the foreground and the second screen executed in the background, the controller 180 outputs the first screen and the second screen such that the transparency of the first screen is applied to the second screen and the transparency of the first screen is increased.

Figure 5D:
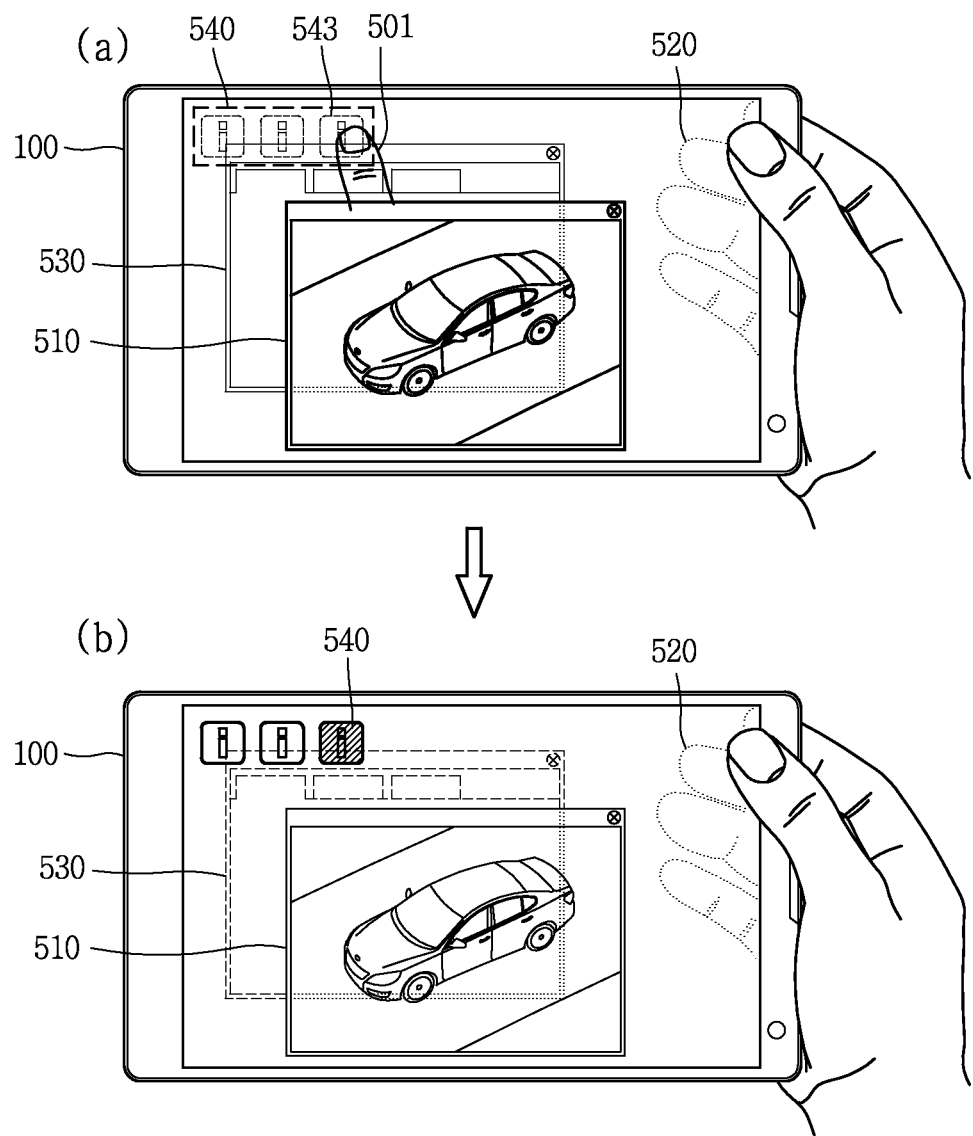

For example, when the touch is applied to an icon 543 displayed on the background screen on the transparency display unit 151 in a state where, as illustrated in FIG. 5D(a), the first transparency (the lowest transparency) is applied to the moving image screen 510, a next-level transparency (hereinafter referred to to as a 2.1 transparency) is applied to the web page screen 530, a next-level transparency (hereinafter referred as to as a 2.2 transparency) is applied to the icons 540 of the background screens, and the highest transparency (hereinafter referred as to the third transparency) is applied to the user's hand 520 that is seen through the transparent display unit 151, the controller 180 applies this touch as a control command for the status switching of the foreground and the background.

Therefore, as illustrated in FIG. 5D(b), icons 540 of the background screens that correspond to an icon 543 to which the touch is applied is output with the first transparency in the foreground. Then, the 2.1 transparency is applied to the moving image screen 510, and the 2.2 transparency is applied to the web page screen 530.

To do this, the controller 180 recognizes coordinates of a region on which the status-switched screen is displayed. Then, based on the coordinates-based region, the controller 180 applies the pre-status-switching transparency stored in the memory 160 in such a manner that the pre-status-switching transparency crosses over the multiple status-switched regions.

A method of controlling the display device 100 in which different transparency is applied only to a specific region of the screen that is output to the transparent display unit 151 is described below. A property of the transparent display unit 151 allows the screen that is output to be seen from behind the transparent display unit 151. The specific region means a region that is set or changed in such a manner that the region is not seen from behind the transparent display unit 151 in order to protect user's personal information or privacy.

Figure 6A:
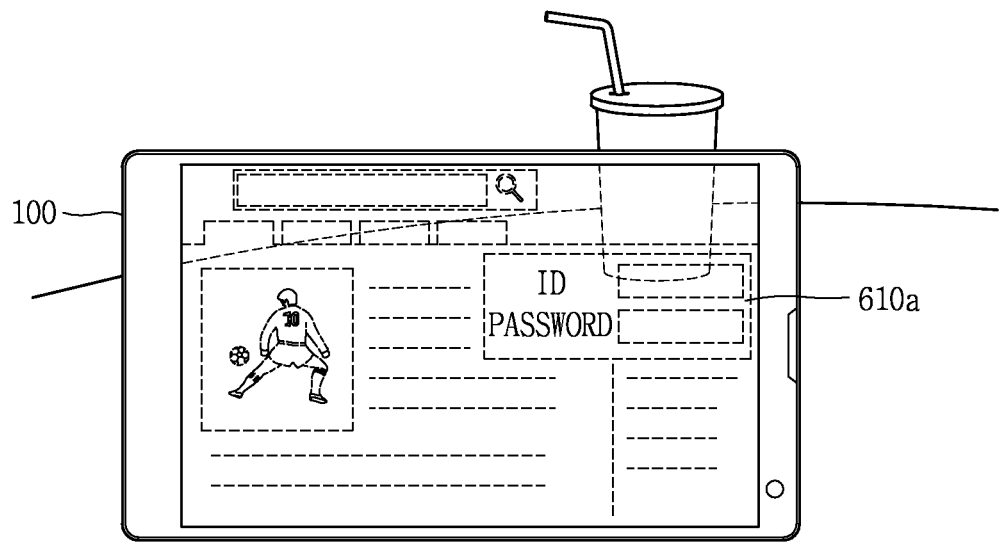
FIGS. 6A to 6C are diagrams for describing a control method in which if an input region is included in a screen that is output to the transparent display unit according to an embodiment of the present invention, transparency of the input region is adjusted in response to an occurrence of a touch event.
Figure 6B:
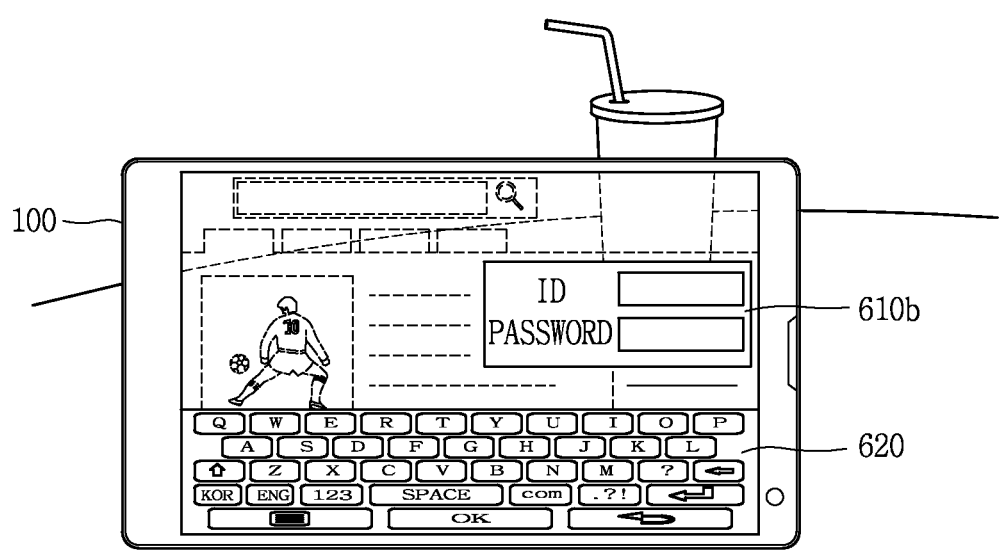
Figure 6C:
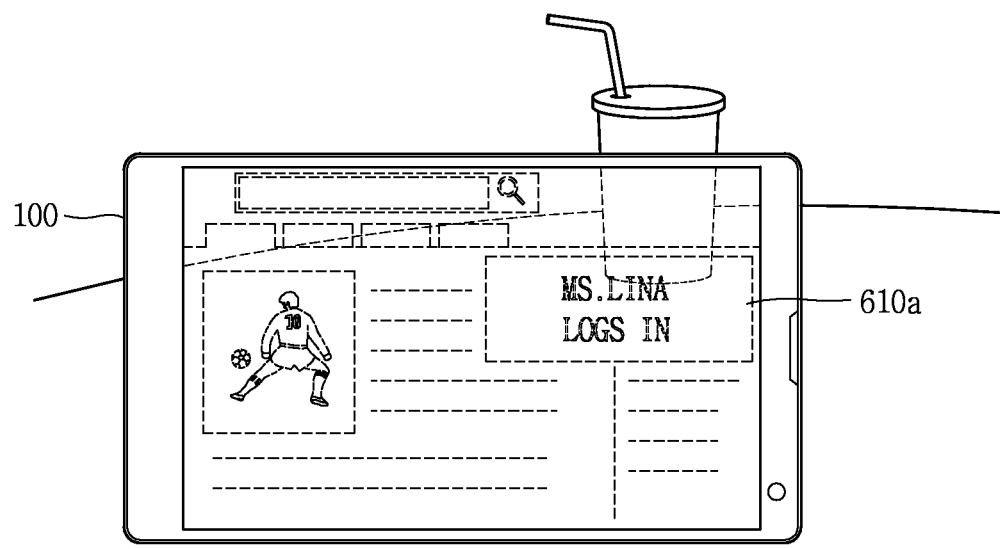

In association with this, FIGS. 6A to 6C illustrate a method in which if an input region is included in the screen that is output to the transparent display unit 151, the transparency of the input region is adjusted in response to an occurrence of the touch event on the input region.

The controller 180 detects the occurrence of a predetermined touch event on the input region of the first screen that is output in the foreground to the transparent display unit 151. At this point, the predetermined touch event is, for example, any one of the short touch input, the long touch input, the touch and drag input and the flicking touch input.

When in this manner, the predetermined touch event occurs on the input region, the controller 180 decreases at least the transparency of the input region or switches the input region to a non-transparency mode until the region disappears.

For example, in FIG. 6A, when the input region, such as an ID window and a password (PW) window for logging-in, are output to the web page screen that corresponds to the web application on the transparent display unit 151 and the user applies the touch input to the ID window or the password (PW) window, the controller 180 recognizes this touch input as a user's gesture for performing the input to the corresponding region. Therefore, as illustrated in FIG. 6B, the transparency of a character is decreased or all the corresponding regions are switched to the non-transparency mode such that the character, which is input to the corresponding region, is difficult to recognize from behind the transparent display unit 151 or is visually recognizable to the user in front of the transparent display unit 151.

Additionally, when a graphic image, such as a virtual keyboard that is output to one region of the transparent display receives the touch corresponding to the input region, the controller 180 decreases the transparency of the region on which the graphic image is displayed to less than the transparency of the first screen or switches the region to the non-transparency mode.

Accordingly, a key to which the touch is applied cannot be seen from behind the transparent display unit 151 and therefore, for example, the user's privacy is protected when inputting a password (PW).

On the other hand, as illustrated in FIG. 6C, when the input of information for logging-in is completed and the input window disappears from the corresponding region and a guide message "Ms. Lina logs in" is displayed, the controller 180 recognizes the output of the guide message as the disappearance of the input region. Accordingly, the transparency of the corresponding region returns to the same value as that of a different region of the web page screen.

Figure 7A:
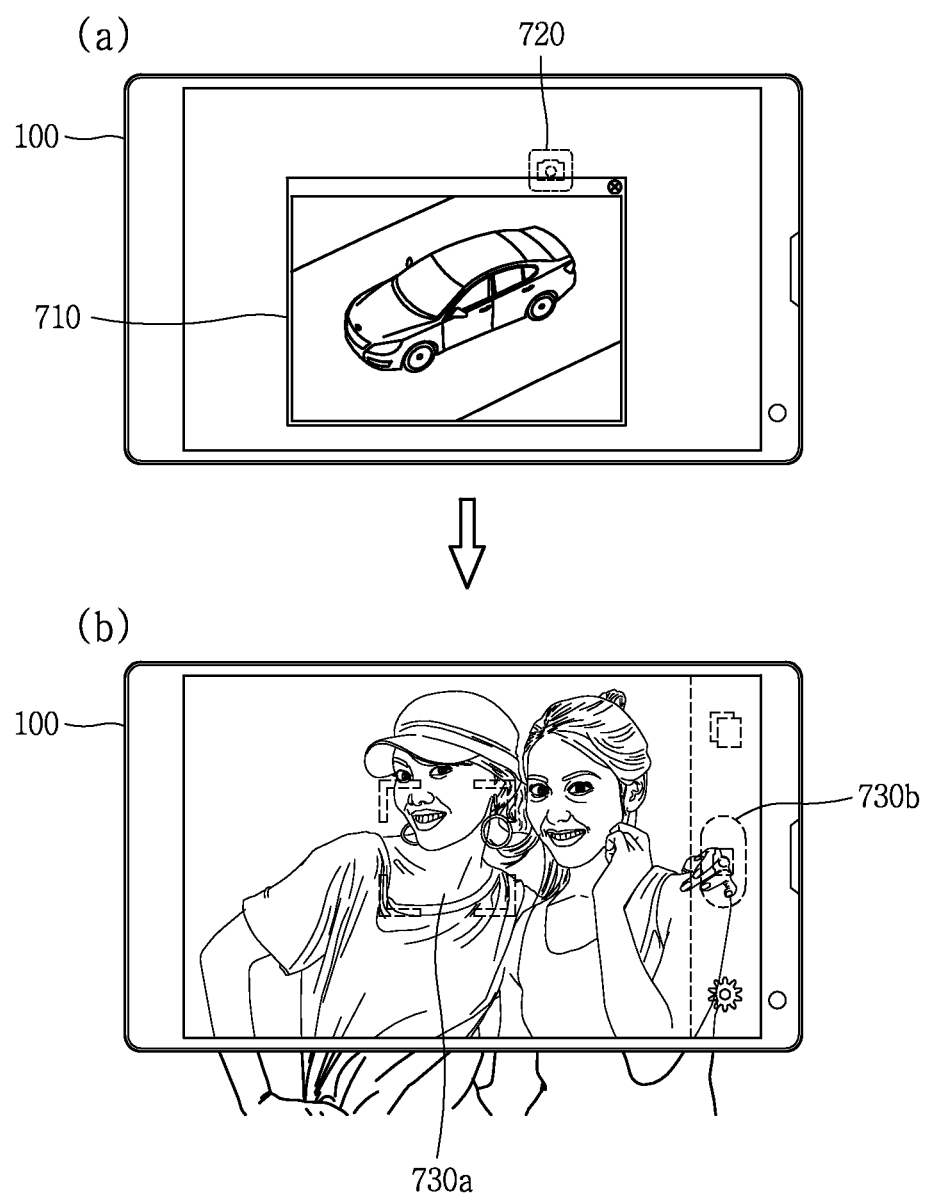
FIG. 7A and FIG. 7B are diagrams for describing a control method in which transparency of a background object that is seen through the transparent display unit and transparency of a screen are adjusted according to an execution state of an application that is executed on the transparent display unit according to an embodiment of the present invention.
Figure 7B:
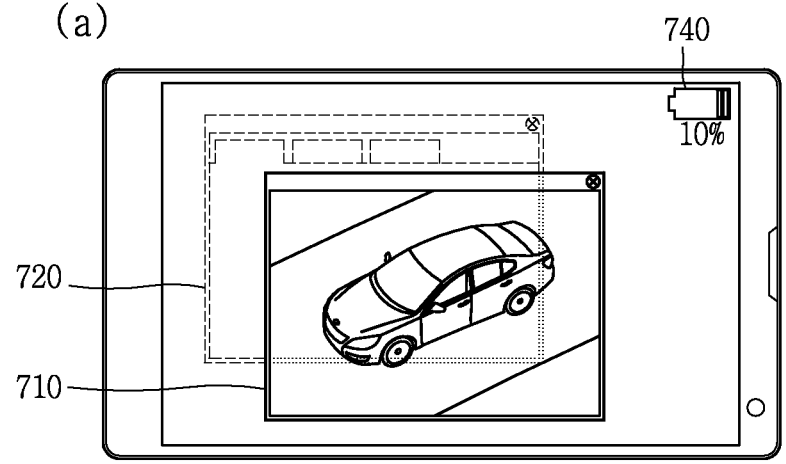
Figure 7B:
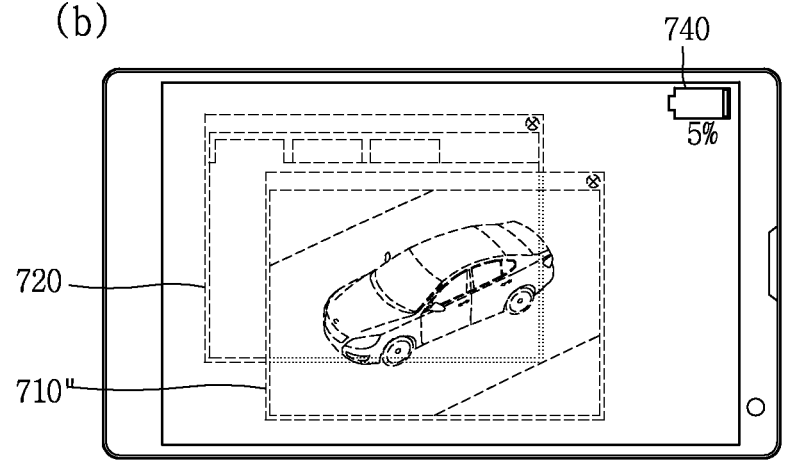

Referring to FIGS. 7A and 7B, a method is described in which the transparency of the background object that is seen through the transparent display unit 151 and the transparency of the screen are adjusted according to an execution state of an application that is executed on the transparent display unit 151 according to the embodiment of the present invention.

In the display device 100 described according to the present invention, the first transparency is applied to the first screen that is executed in the foreground on the transparent display unit 151.

On the other hand, the setting unit 135 sets the clearness priority of each of the background objects and the first screen according to the execution state of the application that is executed on the transparent display unit 151. The clearness priority refers to a setting that determines whether high priority clearness is applied to the background object or high priority clearness is applied to the first screen.

Generally, high priority clearness is applied to the first screen that is executed in the foreground on the transparent display unit 151. However, if it is desirable for the user to recognize the background object more clearly, high priority clearness is to the background object. Therefore, the setting unit 135 may perform such setting only in a state in which an application corresponding to this exceptional situation is to be executed.

When the clearness priority is set in this manner, the controller 180 changes the transparency of any one of the first screen and the background object differently from the predetermined transparency.

Then, based on the clearness priority that is set, the controller 180 changes the transparency of any one of the first screen and background object. That is, the transparency of an object with high priority clearness is deceased and the transparency of an object with low priority clearness is increased.

According to a first embodiment, if an executed state of an application is a preview screen, the camera setting unit 135 sets the clearness priority of the background object to be higher than that of the first screen. That is, the clearness priority of the background object is set such that the background object that is seen through the transparent display unit 151 can be recognized more clearly.

Then, the controller 180 increases the transparency of the first screen with low priority clearness, the transparency of the camera preview screen and decreases the transparency of the background object with high priority clearness to less than the transparency of the first screen. Therefore, the background object is displayed more clearly on the transparent display unit 151.

When the user, as illustrated in FIG. 7A(a), applies the touch to an icon of a photographing application that is output in the background to the transparent display unit 151, the controller 180 recognizes the touch as a control command for entering a photographing mode. When the photographing mode is entered in this manner, the preview screen for photographing subjects 720 with the camera 121 is output to the transparent display unit 151, as illustrated in FIG. 7A(b).

At this point, the subjects are recognized as the same as the background objects that are seen through the transparent display unit 151, and thus high clearness is applied to the background objects in order to allow the background objects to be viewed through the preview screen. Therefore, low clearness is applied to a focusing frame 730a and a menu screen 730b for controlling a photographing operation on the execution screen of the photographing application, thereby increasing the transparency.

On the other hand, when the photographing is performed through the user's input, the controller 180 recognizes that the executed state of the application is changed. Therefore, the controller 180 decreases the transparency of a photograph screen that is output to the transparent display unit 151 and increases the transparency of the background object that is seen through the transparent display unit 151.

As another example, if self-photographing is performed through the use of a mirror located adjacent to the camera 121 instead of photographing background object, a user's face has to be clearly viewed on the preview screen for photographing. Therefore, high transparency is applied to the background object differently than to the preview screen at the time of photographing the subject and is adjusted the transparency such a manner that low transparency is applied to the execution screen of the photographing application.

According to a second embodiment, if a specific application is executed in a state in which a battery almost runs down, the setting unit 135 performs setting such that the clearness of the execution screen corresponding to the specific application is at least the same as that of the background object that is seen through the transparent display unit 151. When this is done, an "on" state is maintained for a longer time by decreasing an amount of electric current that is applied to the transparent display unit 151. In addition, the user can recognize that the application is executed in the state where the battery almost runs down.

For example, referring to FIG. 7B(a), if a battery indicator 740 indicates a predetermined range or below (for example, 5% or below) in a state where a moving image screen 710 is output with the first transparency in the foreground to the transparent display unit 151, and a web page screen 720 is output with the second transparency (the transparency value higher than that of the first transparency) in the background to the transparent display unit 151, the controller 180 recognizes this indication as a control command for adjusting the transparency of the moving image screen 710 that is output in the foreground.

Then, the controller 180, as illustrated in FIG. 7B(b), further increases the transparency by adjusting the amounts of three primary colors (red, green, and blue) of light that penetrates through the region on which the moving image screen 710 is displayed. Thus, battery power is saved.

According to a third embodiment, the setting unit 135 sets different transparency according to a type of application that corresponds to the execution screen that is output in the foreground to the transparent display unit 151.

For example, because more improved visibility is required in the case of a memo application in which characters are input, the transparency value lower than that of the predetermined transparency is applied to output the execution screen. In the case of a message application, in order to prevent a message screen from being recognizable from behind the transparent display unit 151 in personal privacy, the transparency close to that used in the non-transparency mode is applied to the message screen to be output. In the web application, a high transparency value is applied to information, such as a banner advertisement, which is not comparatively important to the user, and the information to which the high transparency value is applied is output. Alternatively, in the examples described above, the predetermined transparency of the execution screen may be maintained but the transparency of the background object that is seen through the transparent display unit 151 is adjusted, and thus an effect of adjusting the transparency of the execution transparency is obtained.

Referring to FIGS. 8A to 8D and FIGS. 9A to 9C, a method is described in which the transparency of all parts of or one part of the entire execution screen that is output is adjusted according to the touch input that is applied to one point or one region of the transparent display unit 151.

FIGS. 8A to 8D are diagrams for describing the method in which the transparency of the screen is adjusted according to the drag touch input that is applied to the transparent display unit 151.

First, the first screen to which the first transparency is applied is output in the foreground to the transparent display unit 151 and the second transparency that results from increasing the first transparency is applied to the background object that is seen through the transparent display unit 151. That is, the transparency of a region on which the first screen is displayed is adjusted differently than the transparency of a region on which the background object is displayed.

When a predetermined touch input occurs on a border region of the first screen, the controller 180 switches one region of the first screen to the non-transparency mode along a dragging direction of the touch input and in proportion to an area that is dragged.

The controller 180 then outputs a visually-distinguishable indicator to at least one border line of the one region of the first screen that is switched to the non-transparency mode.

In addition, when at least one part of the first screen is switched to the non-transparency mode according to the predetermined touch input, the controller 180 sets the first screen to a locked mode in which further inputting of the control command to the first screen is limited on the rear surface of the transparent display unit 151.

In addition, when a drag touch input is detected that is applied in a second direction opposite to the dragging direction with the indicator displayed on the first screen serving as a reference, the controller 180 switches at least one region of the first screen to the transparency mode along the second direction and in proportion to the extent of the dragging and applies the predetermined transparency to the region that is switched to the transparency mode.

Figure 8A:
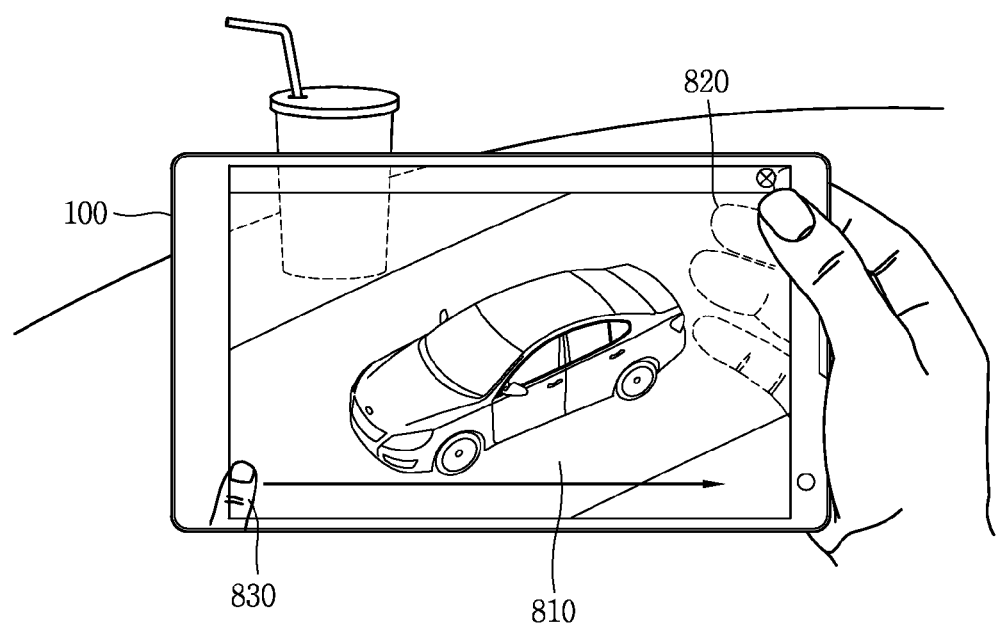
FIGS. 8A to 8D are diagrams for describing a control method in which transparency of a screen is adjusted according to a drag touch input that is applied to the transparent display unit according to an embodiment of the present invention.

More specifically, in a state illustrated in FIG. 8A, a moving image screen 810 to which the first transparency is applied is output to the transparent display unit 151 and the second transparency with a the transparency value higher than that of the first transparency) is applied to a user's hand 820 that is seen through the transparent display unit 151. The controller 180 detects that a touch 830 applied to one border line of the moving image screen 810 is dragged in one direction, for example, in the inward direction.

Figure 8B:
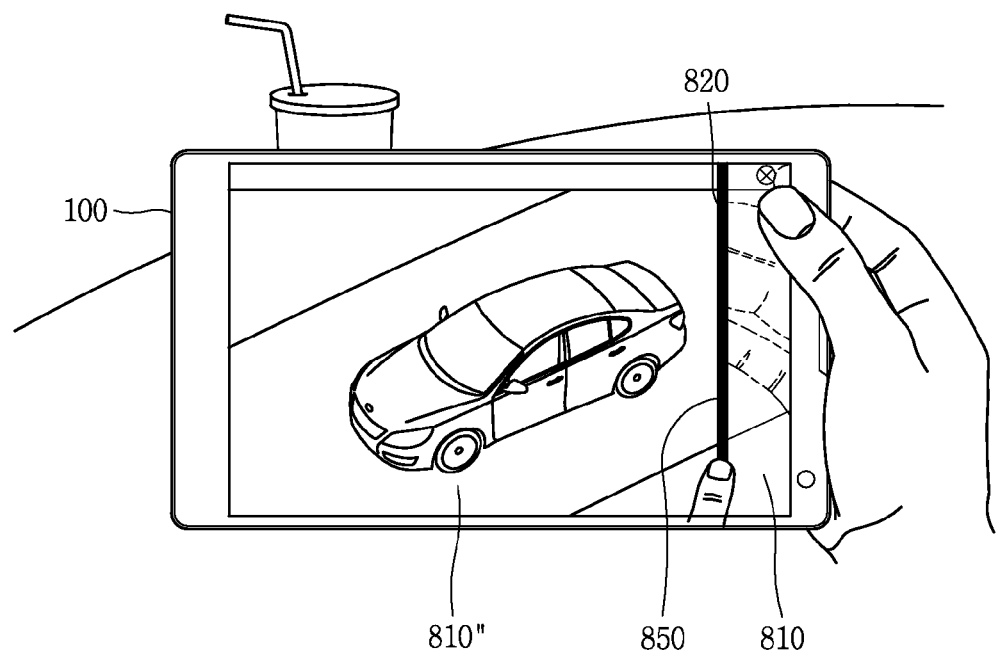

When the drag and touch is detected, as illustrated in FIG. 8B, a moving image screen 810" is output in the non-transparency mode along the dragging direction and in proportion to the extent of the dragging. That is, the moving image screen 810 corresponding to an area from a touch starting point to a touch ending point is output in the non-transparency. Then, a moving image screen 810' corresponding to the remaining area maintains the transparency.

In such a state, an indicator 850 in the form of a bar for visually distinguishing between a first region 810" corresponding to the non-transparency mode and a second region 810' corresponding to the transparency mode is output to a point at which the drag touch is terminated.

Figure 8C:
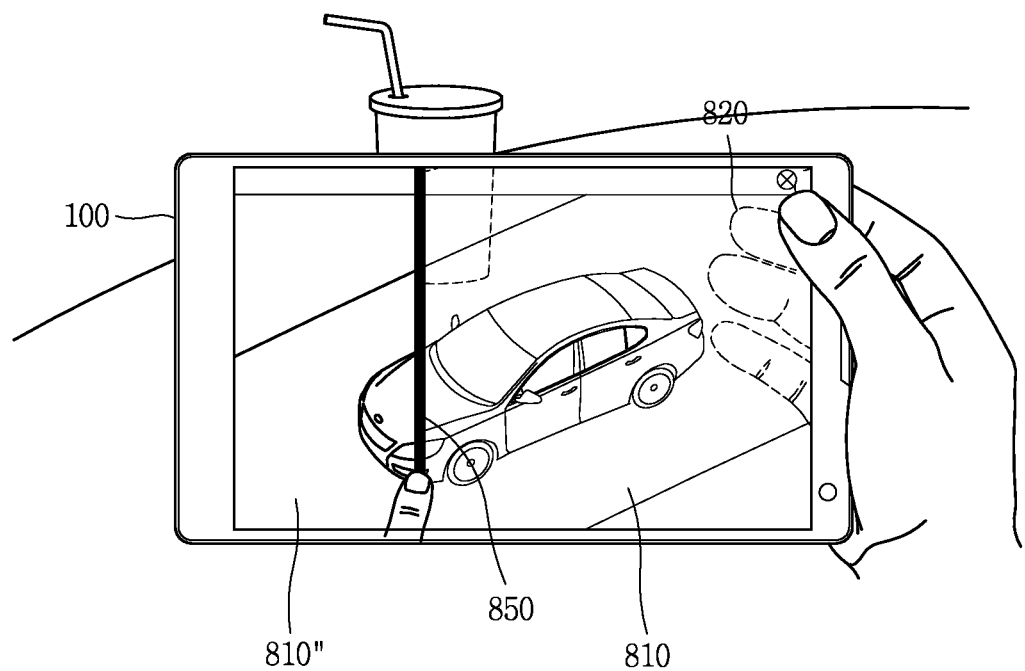

When, as illustrated in FIG. 8C, the user moves the indicator 850 in one direction, for example, in the rightward direction (or in the direction that approaches the first region 810" corresponding to the non-transparency mode), the areas of the regions that correspond to the transparency mode and the non-transparency mode, respectively, are adjusted. That is, the area of the second region 810' corresponding to the transparency mode is increased and the area of the first region 810" corresponding to the non-transparency mode is decreased. Therefore, the user's hand 820 located behind the transparent display unit 151 is seen through the transparent display unit 151.

Figure 8D:
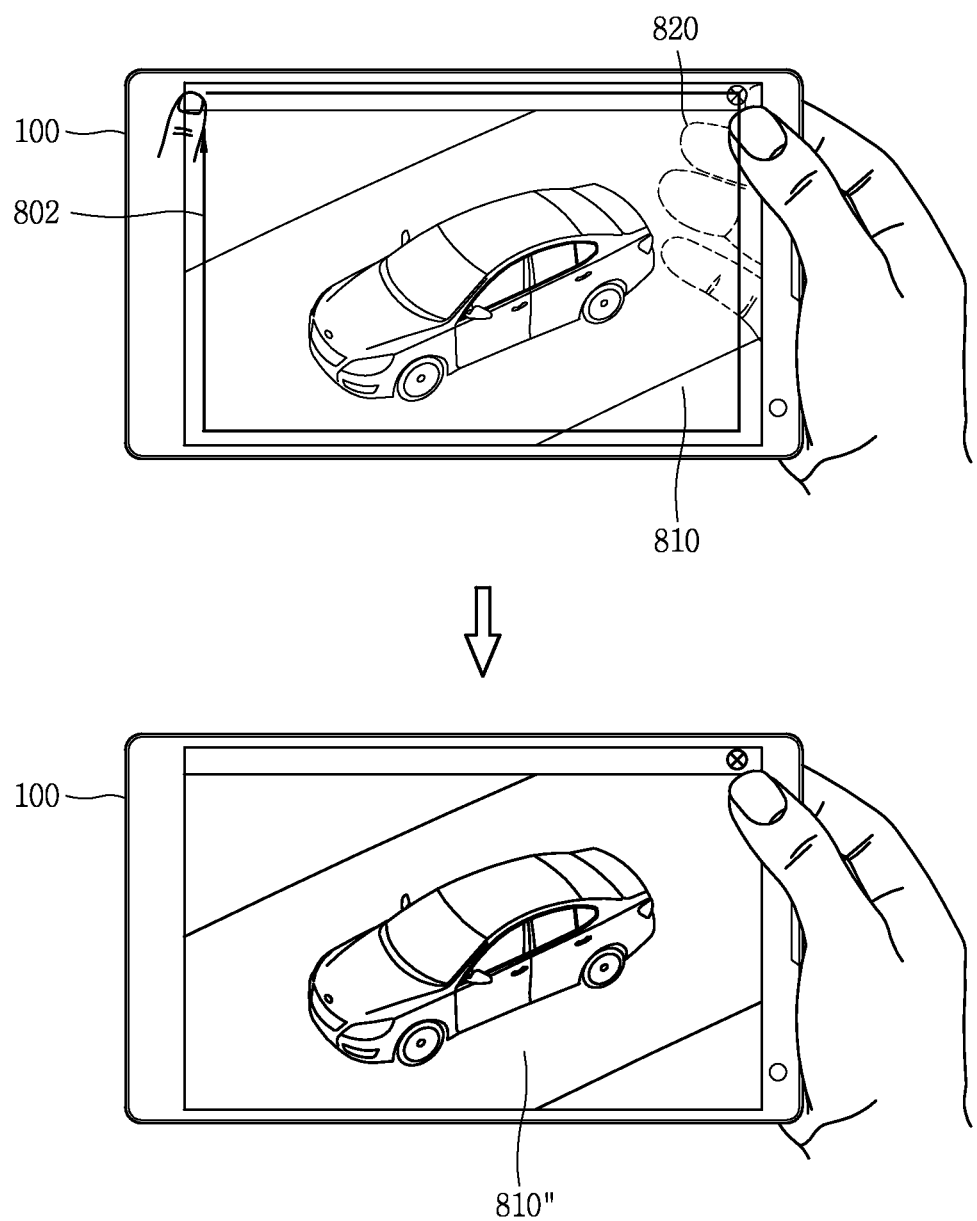

On the other hand, at least one part of the first screen to which the predetermined transparency is applied is switched to the non-transparency mode using another way of touching. For example, as illustrated in FIG. 8D, the user can drag the border lines in multiple directions while drawing a polygon with one border point on the first screen as the touch starting point and then return back to the touch starting point. By using this way of touching, the user can switch all regions of the first screen to the non-transparency mode.

Figure 9A:
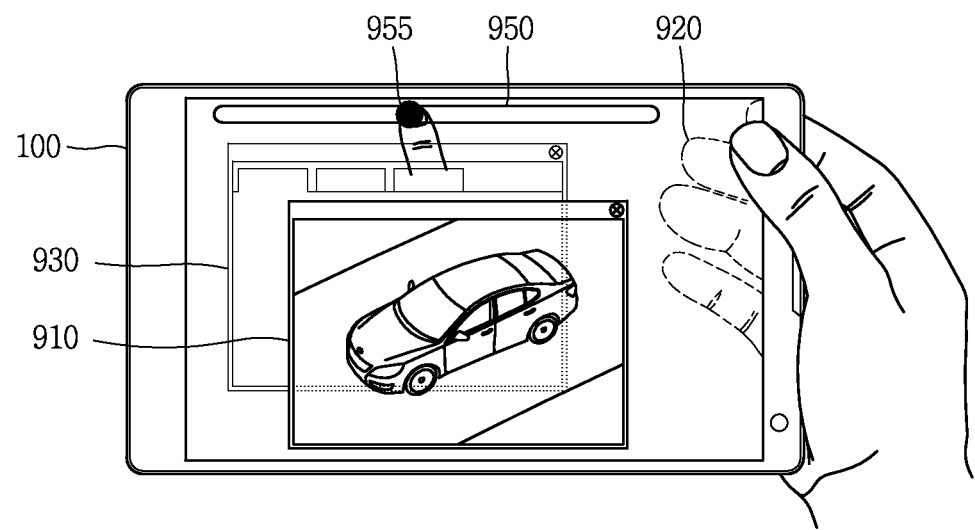
FIGS. 9A to 9C are diagrams for describing a control method in which transparency of the screen that is output to the transparent display unit is adjusted using an indicating icon according to an embodiment of the present invention.
Figure 9B:
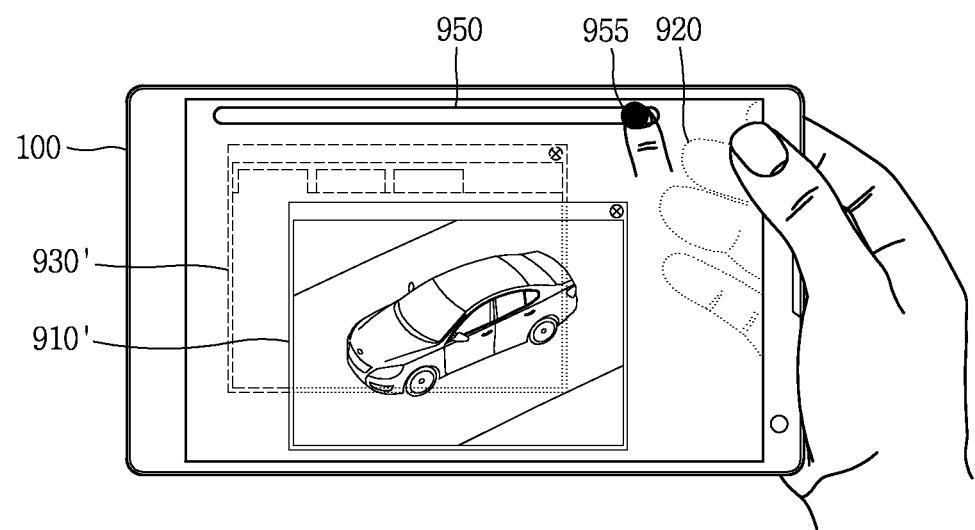
Figure 9C:
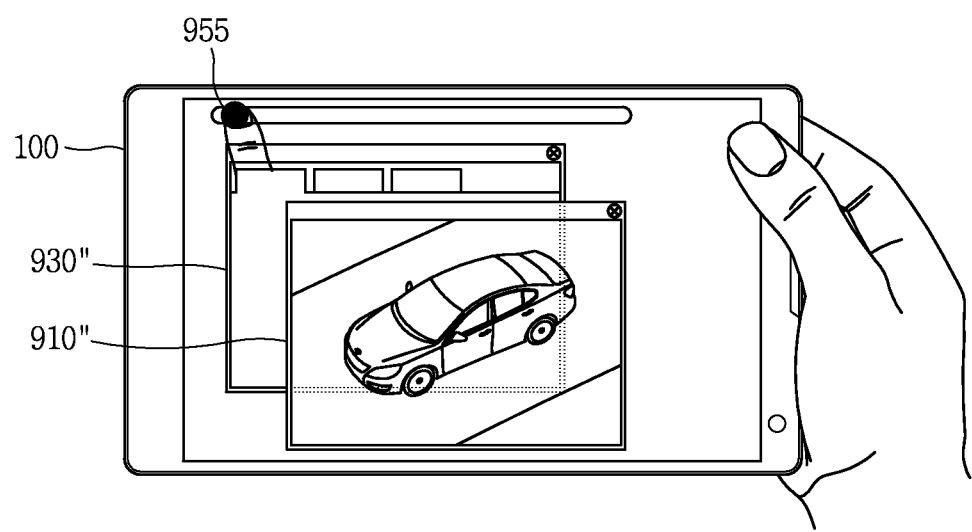

FIGS. 9A to 9C are diagrams for describing the method in which the transparency of the screen is adjusted using an indicating icon that is displayed on the transparent display unit 151.

An indicating bar for adjusting the transparency that is applied to the first screen that is executed in the foreground is displayed on one region of the transparent display unit 151.

When a predetermined-type touch input is applied to one point on such an indicating bar, the controller 180 recognizes this application of the predetermined-type touch input as a control command for changing the transparency of the screen. The controller 180 adjusts the transparency of the first screen differently according to the extent to which the touch applied to one point on the indicating bar is dragged.

For example, referring to FIG. 9A, in a state where a moving image screen 910 to which the first transparency is applied is output in the foreground to the transparent display unit 151 and a web page screen 930 to which the second transparency (the transparency value higher than that of the first transparency) is applied is displayed in the background on the transparent display unit 151, an indicating bar 950 for adjusting the transparency of at least one of the moving image screen 910 and the web page screen 930 is output to one region, for example, a upper region of the transparent display unit 151, and a moving indicator 955 is displayed within the indicating bar 950. The user can adjust the transparency of the transparent display unit 151 by applying the drag touch to the moving indicator 955 within the indicating bar 950 and thus moving the moving indicator 955.

Although not illustrated, the multiple indicating bars 950 may be provided to adjust the transparency of the multiple screens, respectively.

For example, as illustrated in FIG. 9B, when the moving indicator 955 on the indicating bar 950 is moved in one direction, for example, in the rightward direction, a moving image screen 910' and a web page screen 930' each transparency of which is increased (that is, each clearness of which is decreased) are output to the transparent display unit 151. In another example, only the transparency of the moving image screen 910 that is executed in the foreground may be changed or only the transparency of each of the background screens 920 and 930 other than the screen 910 may be changed.

On the other hand, as illustrated in FIG. 9C, when the moving indicator 955 on the indicating bar 950 is moved in one direction, for example, in the leftward direction, a moving image screen 910' and a web page screen 930' each transparency of which is decreased (that is, each clearness of which is increased) or which are switched to the non-transparency mode are output to the transparent display unit 151.

In another example, a state of the first screen that is output to the transparent display unit 151 may be switched to the non-transparency mode according to the input of a hot key (not illustrated) provided in the display device 100.

Figure 10:
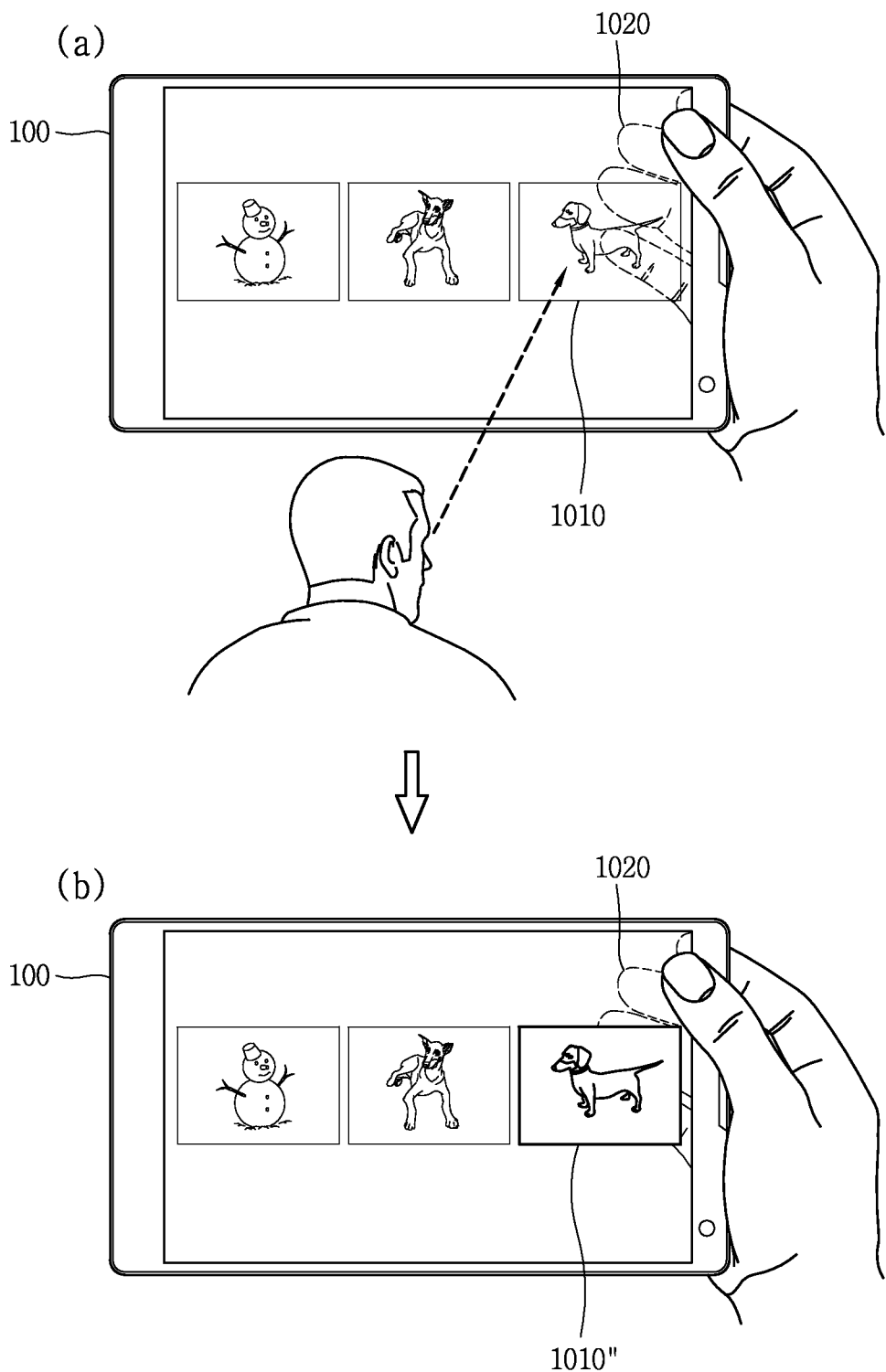
FIG. 10 is diagram for describing a control method in which transparency of the screen that is output to the transparent display unit is adjusted based on a user's gaze.

FIG. 10 is diagram illustrating a method in which the transparency of the screen that is output to the transparent display unit 151 is adjusted based on a user's gaze.

To do this, the display device 100 includes a gaze tracking unit (not illustrated) that detects the user's gaze within a predetermined range with the transparent display unit 151 serving as a reference. The gaze tracking unit includes the camera 121 and an infrared sensor (not illustrated).

The gaze tracking unit (not illustrated) is enabled when entering a transparency adjustment mode, and an indicator (not illustrated) corresponding to the gaze tracking unit is output to one region of the transparent display unit 151.

Based on the user's gaze that is tracked by the gaze tracking unit, the controller 180 changes the transparency of at least one region of the first screen that is output in the foreground of the transparency display unit 151.

Specifically, when the detected user's gaze that is detected is fixed on a specific region of the first screen for a predetermined time, the controller 180 gradually decreases the transparency of the specific region or switches the specific region to the non-transparency mode.

For example, the detected user's gaze is fixed on a specific photograph 1010 for the predetermined time (for example, for five or more seconds), when a photograph application is executed on the transparent display unit 151 and multiple photographs are output with predetermined first transparency, as illustrated in FIG. 10(a), the controller 180 recognizes a coordinates-based region on which the corresponding photograph is displayed for switching to the non-transparency mode. As illustrated in FIG. 10(b), the controller 180 outputs a photograph 1010" that is switched to the non-transparency mode, thereby improving visibility by making a different background screen unseen on the photograph that the user is viewing.

On the other hand, when it is detected that a given time elapses after the photograph 1010" that is switched to the non-transparency mode is output, the photograph application is terminated, or when the user's gaze is fixed on another photograph, the transparency of the region to which the photograph 1010" is output is changed again. That is, the transparency of the region to which the photograph 1010" is output is switched to the transparency mode.

Figure 11A:
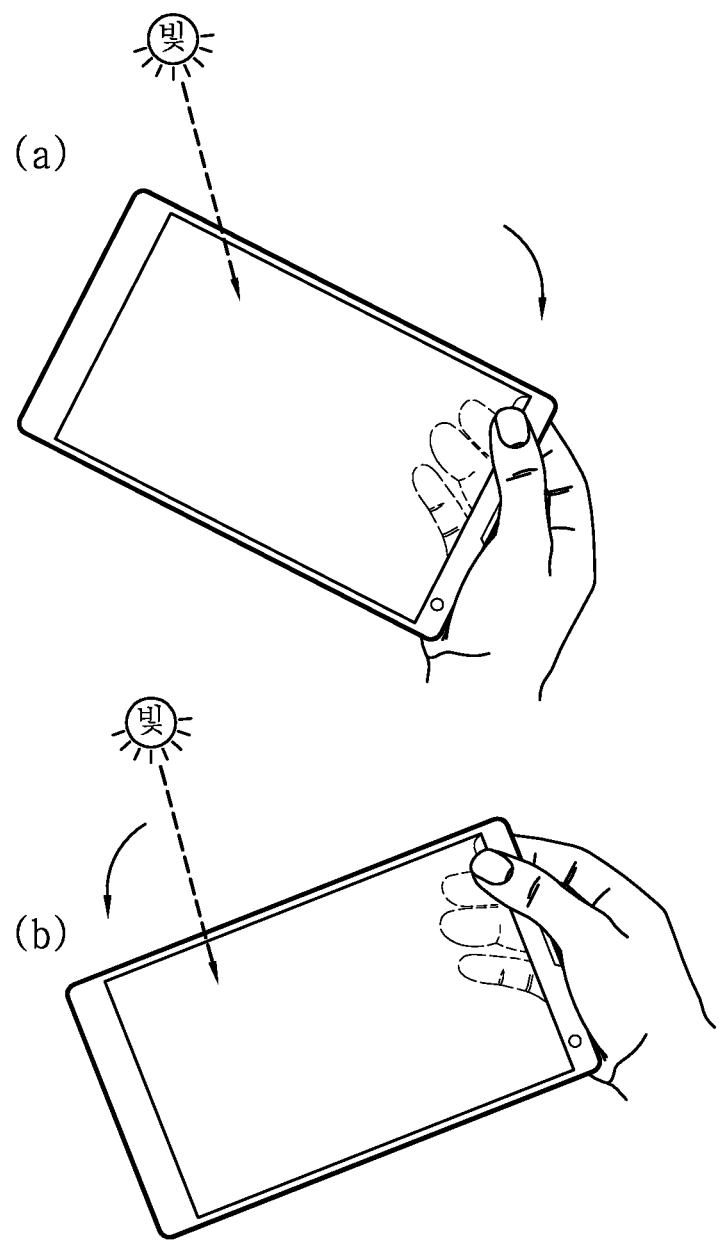
FIG. 11A and FIG. 11B are diagrams for a control method in which transparency of a character in the screen that is output to the transparent display unit is adjusted in response to the strength of light entering the transparent display unit changings according to an inclination of a terminal.
Figure 11B:
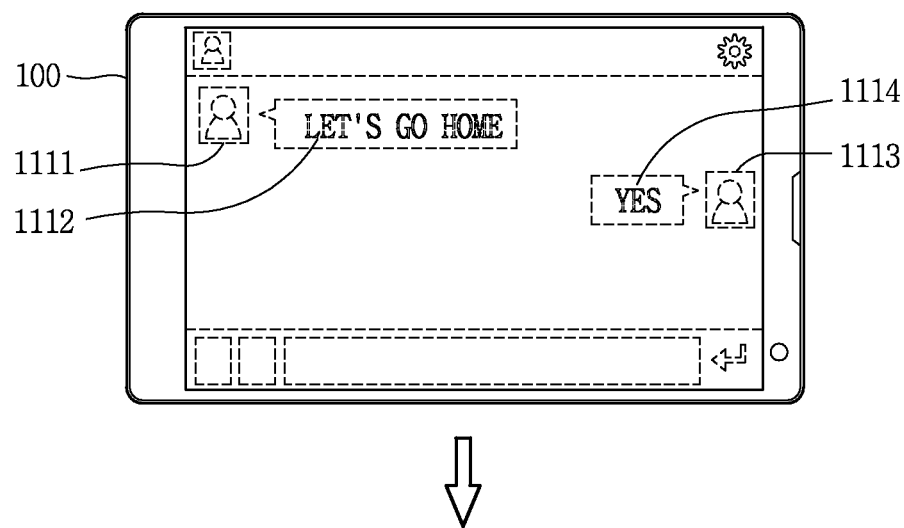
Figure 11B:
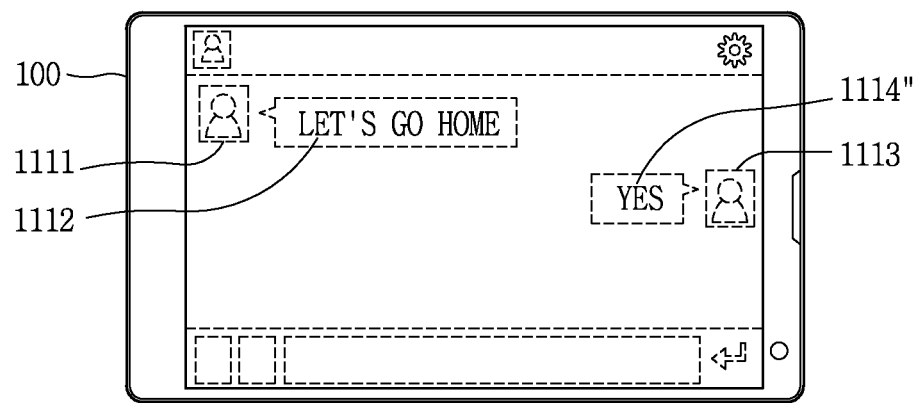

FIGS. 11A and 11B are diagrams for a control method in which the transparency of a character on the screen that is output to the transparent display unit 151 is adjusted in response to the strength of light entering the transparent display unit 151 changing according to an inclination of the terminal.

To do this, the sensing unit 140 of the display device 100 detects a change in the inclination of the terminal and detects a change in the strength of light entering the transparent display unit 151.

For example, when the terminal, as illustrated in FIG. 11A(a) that is inclined in such as to the right then is inclined a second direction to the left, as illustrated in FIG. 11A(b), the strength of light entering the transparent display unit changes. It is assumed that when the terminal is inclined in the first direction, strong light enters only an A region of the transparent display unit 151, and when the terminal is inclined in the second direction, weak light enters the A region of the transparent display unit 151 and strong light enters a B region. Or, in other words, the strength of light that enters a specific region of the transparent display unit 151 varies according to the inclination of the terminal.

Based on the change in the strength of light that is detected a difference in transparency between the first region, on which a character in the first screen is displayed, and the second region that is out of the first region is adjusted.

For example, when the strength of light entering all regions of the transparent display unit 151 is increased, the transparency of the first region is further decreased and the transparency of the second region is decreased or maintained, in order to increase the difference in transparency. This improves the visibility of the region of the first screen, on which the character is displayed. In addition, when the strength of light entering only a specific region of the transparent display unit 151 is increased, the transparency of the region on which the character that is present within the corresponding region is displayed is decreased to improve the visibility of the specific region.

For example, when a strength level of light is increased according to the inclination of the terminal in a state where, as illustrated in FIG. 11B(a), a conversation screen corresponding to a message application is output to the transparent display unit 151, the transparency of each of the characters 1112 and 1114 that correspond to the conversation content on the conversation screen is decreased or is switched to characters 1112" and 1114" that are switched to the non-transparency mode. This is done to make it easy to recognize the characters and increase visibility.

In addition, based on the detected change in the strength of light, a characteristic of the character, such as a size (enlarged), a color(darkened), a thickness(thickened), or a font is changed in a manner that improves visibility.

Figure 12:
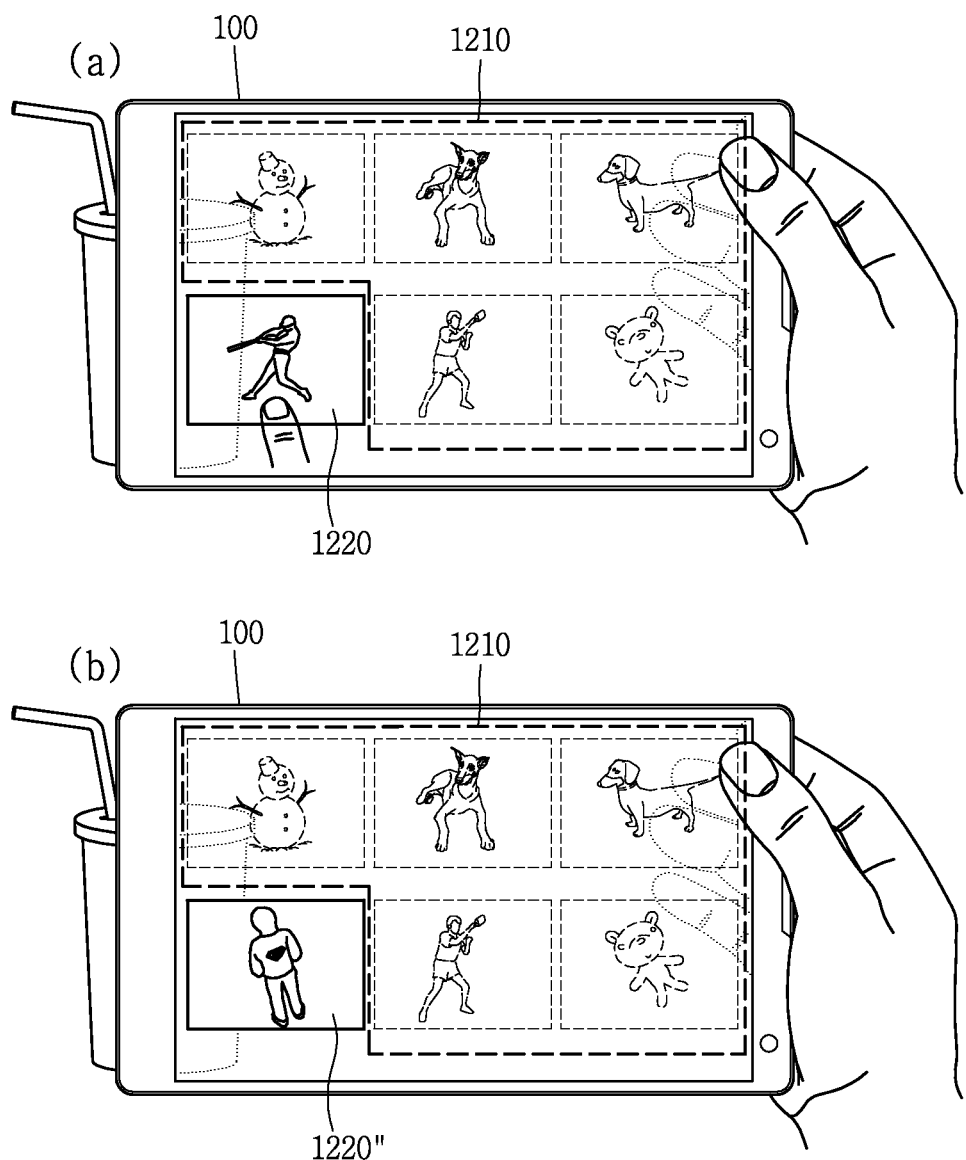
FIG. 12 is diagram for describing a control method in which transparency of a region on which a specific object is displayed is adjusted based on a selection signal that is applied to the transparent display unit.

Referring to FIG. 12, a control method is described in which the transparency of a region on which a specific object is displayed is adjusted based on a selection signal that is applied to the transparent display unit 151 according to an embodiment of the present invention.

In a state in which the first screen to which the first transparency is applied is output to the transparent display unit 151, and the second transparency (a transparency value higher than that of the first transparency) is applied to the background object that is seen through the transparent display unit 151, the controller 180 detects a selection signal with respect to the specific object on the first screen.

The election signal occurs, for example, when the touch input is detected on the region on which the specific object is displayed or a specific key input is detected in a state in which the specific object is pointed to.

When the selection signal occurs on the specific object, the controller 180 switches the region of the first screen, on which the specific object is displayed, to the non-transparency mode. In addition, the controller 180 outputs to the screen a given indication (for example, a highlighting effect) that corresponds to the switching of the specific object to the non-transparency mode.

For example, if the user applies the touch input to a specific photograph 1220 in a state in which when a photograph application is executed and multiple photographs are output in the foreground to the transparent display unit 151 as illustrated in FIG. 12(a), the corresponding photograph 1220 is switched to the non-transparency mode and a frame is displayed on the border. Therefore, the corresponding photograph 1220 is easily distinguished visually from other photographs 1210 that are output with the predetermined transparency (the first transparency) and from the user's hand (the second transparency) that is seen through the transparent display unit 151.

On the other hand, if the specific object is switched to the non-transparency mode and the user then executes the application in the transparency mode or the transparency mode is selected in a state in which the corresponding application is executed, the controller 180 prevents the specific object that is switched to the non-transparency mode from being further displayed on the first screen.

In addition, the controller 180 outputs a previously registered image, such as another photograph image, to the region on which the specific object is displayed, and outputs an indication (for example, a different background color, different transparency, a blinking effect, and so forth) that is recognizable as a substitute image.

For example, FIG. 12(b) illustrates a different photograph 1220" output as a substitute image to the region to which the specific photograph 1220 that is switched to the non-transparency mode is output. Although not illustrated, the highlighting effect (blinking, different transparency, a different color, and so forth) is output to the border of the different photograph 1220", as an indication that the different photograph 1220" is a substitute image.

FIG. 13 is diagram for describing a method in which if selection of a specific object for adjusting the transparency is made from behind the transparent display unit 151, the transparency of the selected specific object is adjusted.

To do this, the transparent display unit 151 includes touch sensors in the front and rear surfaces, respectively. The transparent display unit having he structure described in FIG. 4A may include selective light-penetration members 402a and 402b in the front and rear surfaces thereof, respectively.

With this configuration, the controller 180 calculates the coordinates of a touch input that is applied to a specific object from behind the transparent display unit 151. When the first screen that is output with the first transparency to the transparent display unit 151 is viewed from behind the transparent display unit 151, the image of the first screen is displayed in a state in which the image on the first screen is reversed from left to right. That is, an object that is displayed on the right side of the first screen that is output to the transparent display unit 151 appears to be displayed on the left side when viewed by the user from behind the transparent display unit 151. Accordingly, when the touch sensor located in the rear surface of the transparent display unit 151 detects the touch applied to a specific object, the controller 180 changes or switches calculated coordinates to corresponding coordinates in the front surface.

When the coordinates corresponding to the selection signal that is detected through the rear surface are determined, the controller 180 switches the specific object that is displayed on the front surface of the transparent display unit and that corresponds to the determined coordinates, to the non-transparency mode. Specifically, the controller 180 differently outputs the transparency of the region on which the specific object is displayed and the transparency of the region of the first screen that is out of the region on which the specific object is displayed, by differently adjusting each of amounts of three primary colors (red, green, and blue) of light that penetrate through the selected specific object and the region of the first screen that is out of the specific object.

For example, when the user applies the touch to a region on which a specific photograph 1310 is displayed from behind the transparent display unit 151 in a state in which a photograph application is executed and multiple photographs are output to the transparent display unit 151 with the first transparency, as illustrated in FIG. 13A, the controller 180 recognizes this touch as the selection of the specific photograph 1310. Then, as illustrated in FIG. 13(b), only the corresponding photograph 1310 is switched to the non-transparency mode. Then, other photographs 1320 maintain the first transparency value.

In addition, the image of the corresponding specific object may disappear and the previously already-registered substitute image may be displayed.

The transparency is differently adjusted on the basis of the region with the recognized coordinates serving as a reference, and the specific object is selectively switched to the non-transparency mode. This accomplishes an effect of protecting the user's privacy.

As described above, in the display device and the method of controlling the display device according to the embodiment of the present invention, visibility can be improved by differently setting the transparency of the screen of the application that is being executed on the transparent display unit and the transparency of the background screen that is seen through the transparent display unit. In addition, when an event associated with transparency control occurs, the transparency of a specific region of a previously-output screen can be changed.

Therefore, a user's privacy can be protected by improving the visibility of a desired specific part of the transparent display unit improve or by behinding the specific part in such that the specific part cannot be seen from behind the transparent display unit.

The foregoing embodiments and advantages are merely exemplary and are not to be considered as limiting the invention. The present teachings can be readily applied to other types of apparatuses. This description is intended to be illustrative, and not to limit the scope of the claims. Many alternatives, modifications, and variations will be apparent to those skilled in the art. The features, structures, methods, and other characteristics of the exemplary embodiments described herein may be combined in various ways to obtain additional and/or alternative exemplary embodiments.

As the present features may be embodied in several forms without departing from the characteristics thereof, it should also be understood that the above-described embodiments are not limited by any of the details of the foregoing description, unless otherwise specified, but rather should be considered broadly within its scope as defined in the appended claims, and therefore all changes and modifications that fall within the metes and bounds of the claims, or equivalents of such metes and bounds are therefore intended to be embraced by the appended claims.

What is claimed is:

1. A display device comprising:
   a transparent display capable of displaying a first screen in a foreground of the transparent display; and
   a controller capable of:
   setting transparency level the first screen and applying the set transparency level to the first screen;
   setting transparency level of background object that is visible through the transparent display based on the transparency level of the first screen, wherein the transparency level of the background object is higher than the transparency level of a first screen; and
   changing at least the transparency level of the first screen or the transparency level of the background object in response to a display of a second screen;
   applying the transparency level of the background object to the second screen and increasing the transparency level applied to the background object when the second careen is displayed behind the first screen; and
   applying the transparency level of the first screen to the second screen and increasing the transparency level applied to each of the first screen and the background object when the second screen is displayed in front of the first screen.

2. The display device of claim 1, wherein the controller is further capable of setting different transparencies of each of a plurality of background objects that are visible through the transparent display according to a distance between each of the a plurality of background objects and the transparent display.

3. The display device of claim 1, wherein the controller is further capable of:
   setting transparency level of the second screen that is displayed behind the first screen higher than the set transparency level of the first screen and decreasing a transparency of the first screen to less than a transparency previously set for the second screen; and
   setting the transparency level of the background object higher than the set transparency level of each of the first and second screens.

4. The display device of claim 3, wherein the controller is further capable of:
   setting transparency levels of a plurality of screens displayed behind the first screen, the transparency levels set in a sequential order from a highest transparency to a lowest transparency such that a screen that corresponds to an application executed most recently has the lowest transparency level set and a screen that corresponds to an application executed most previously has the highest transparency level set; and
   setting transparency level of the background object higher than the highest transparency level set for the screen corresponding to the application executed most previously.

5. The display device of claim 3, wherein the controller is further capable of:
   switching the set transparency level of the first screen and the set transparency level of the second screen when an indication is received to switch the first screen and second screen.

6. The display device of claim 1, wherein the controller is further capable of decreasing the set transparency level of an input region of the first screen or applying a non-transparency mode to the input until the input region disappears from the first screen when a predetermined touch is received on the input region.

7. The display device of claim 6, wherein the controller is further capable of decreasing a set transparency level of a region of the transparent display on which a graphic image is displayed to less than the set transparency level of the first screen or switching the region to the non-transparency mode when a touch corresponding to the region is received on the graphic image.

8. The display device of claim 1, wherein the controller is further capable of:
   setting a clearness priority of the background object and first screen according to an execution status of an application that is executed on the transparent display;
   changing the set transparency level of the first screen or the background object based on the set clearness priority.

9. The display device of claim 8, wherein the controller is further capable of:
   setting the clearness priority of the background object higher than the clearness priority of the first screen;
   increasing the set transparency level of the first screen; and
   decreasing the set transparency level of the background object to less than the set transparency level of the first screen if the execution status of the application is a preview screen of a camera.

10. The display device of claim 1, wherein the controller is further capable of setting the transparency level of the first screen according to a type of application that corresponds to the first screen.

11. The display device of claim 1, wherein the controller is further capable of:
    applying a non-transparency mode to at least one region of the first screen when a dragging touch input is received on a border region of the first screen in a first direction, the non-transparency mode applied along the first direction and in proportion to an extent of the dragging.

12. The display device of claim 11, wherein the controller is further capable of applying a transparency mode to the at least one region of the first screen when a dragging touch input is received on the border region of the first screen in a second direction that is opposite to the first direction, the transparency mode applied at a predetermined transparency along the second direction and in proportion to an extent of the dragging.

13. The display device of claim 1, wherein the controller is further capable of:
    displaying an indicator for adjusting the set transparency level of the first screen; and
    adjusting the set transparency level of the first screen according to an extent to which a touch applied to the indicator is dragged.

14. The display device of claim 1, wherein the controller is further capable of:
    detecting a user's gaze within a predetermined range of the transparent display; and
    changing the set transparency level of at least one region of the first screen according to the detected gaze.

15. The display device of claim 14, wherein the controller is further capable of gradually decreasing the set transparency level of a specific region of the first screen or applying a non-transparency mode to the specific region of the first screen when the detected gaze is fixed on the specific region for a predetermined time.

16. The display device of claim 1, further comprising a sensor capable of detecting a change in strength of light incident on the transparent display according to an inclination of the transparent display, wherein the controller is further capable of adjusting a difference in set transparency level between a first region of the first screen on which at least one character is displayed and a second region of the first screen that is not part of the first region.

17. The display device of claim 1, wherein the controller is further capable of:

applying a non-transparency mode to a region of the first screen on which a specific object is displayed when a signal related to the specific object is received; and displaying an indicator of the non-transparency mode.

18. The display device of claim 17, wherein the controller is further capable of replacing the specific object on the first screen with a previously-registered substitute image when the non-transparency mode is applied during execution of an application corresponding to the first screen.

19. A method of controlling a display device, the method comprising:

displaying a first screen in a foreground of a transparent display;

setting transparency level of the first screen and applying the set transparency level to the first screen;

determining transparency level of background object that is visible through the transparent display based on the transparency of the first screen, wherein the transparency level of the background object is higher than the transparency level of a first screen;

changing at least the transparency level of the first screen or the transparency level of the background object in response to a display of a second screen;

applying the transparency level of the background object to the second screen and increasing the transparency level applied to the background object when the second screen is displayed behind the first screen; and applying the transparency level of the first screen to the second screen and increasing the transparency level applied to each of the first screen and the background object when the second screen is displayed in front of the first screen.

* * * * *